Aug. 29, 1961 W. H. RAMBO 2,998,133

METHODS AND MECHANISMS FOR ACCUMULATING A PREDETERMINED NUMBER OF UNITS DELIVERED AT RANDOM INTERVALS THERETO

Filed May 2, 1955 8 Sheets-Sheet 1

INVENTOR.
William H. Rambo
BY
G. Wright Arnold
ATTORNEY

INVENTOR.
William H. Rambo
BY
Gilbright Arnold
ATTORNEY

Aug. 29, 1961 W. H. RAMBO 2,998,133

METHODS AND MECHANISMS FOR ACCUMULATING A PREDETERMINED NUMBER OF UNITS DELIVERED AT RANDOM INTERVALS THERETO

Filed May 2, 1955 8 Sheets-Sheet 3

INVENTOR.
William H. Rambo
BY [signature]
ATTORNEY

INVENTOR.
William H. Rambo
BY
G. Wright Arnold
ATTORNEY

INVENTOR.
William H. Rambo
BY G. Wright Arnold
ATTORNEY

Aug. 29, 1961 W. H. RAMBO 2,998,133

METHODS AND MECHANISMS FOR ACCUMULATING A PREDETERMINED NUMBER OF UNITS DELIVERED AT RANDOM INTERVALS THERETO

Filed May 2, 1955 8 Sheets-Sheet 6

INVENTOR.
William H. Rambo
BY
G. Wright Arnold
ATTORNEY

Aug. 29, 1961 W. H. RAMBO 2,998,133

METHODS AND MECHANISMS FOR ACCUMULATING A PREDETERMINED NUMBER OF UNITS DELIVERED AT RANDOM INTERVALS THERETO

Filed May 2, 1955 8 Sheets-Sheet 7

INVENTOR.
William H. Rambo
BY G. Wright Arnold
ATTORNEY

INVENTOR.
William H. Rambo
BY
G. Wright Arnold
ATTORNEY

United States Patent Office 2,998,133

Patented Aug. 29, 1961

2,998,133

METHODS AND MECHANISMS FOR ACCUMULATING A PREDETERMINED NUMBER OF UNITS DELIVERED AT RANDOM INTERVALS THERETO

William H. Rambo, Loyalty Bldg., Portland 4, Oreg.

Filed May 2, 1955, Ser. No. 505,352

51 Claims. (Cl. 209—90)

The present invention relates to unit accumulator mechanism, and further relates to such mechanism as used in conjunction with an automatic unit sorting device where accumulation of a predetermined number of sorted units is desired. More specifically, the present invention relates to bin-type accumulator mechanism employed in connection with an automatic lumber sorting device, such as that describel in my co-pending application Ser. No. 465,593, entitled "Sorting of Lumber," filed October 29, 1954. By means of the present accumulator mechanism a predetermined number of lumber units may be accumulated as a "load" and readily segregated from the random flow of sorted units to provide a "load" of precise count for a subsequent processing operation, such as a stacker.

According to conventional practice, lumber units after being sorted as to size and/or grade are manually stacked into the desired load, or are in certain instances delivered to a stacker without any precise determination of the number of units so delivered. Either such expedient is necessarily an inefficient and time-consuming task. Even when a sorting mechanism is employed, the random delivery of the sorted units at several locations requires the close attention of a relatively large number of operators, who generally must give some attention to handling each individual unit accumulated.

Accordingly, it is an object of the present invention to provide accumulator mechanism capable of accumulating a precise, predetermined number of units automatically.

It is a more specific object of the present invention to provide accumulator mechanism whereby, following accumulation of a predetermined number of units, the delivery of such units to the main load receiving portion of the accumulator is automatically interrupted and thereafter accumulated at a segregated position, the load of predetermined number in the main load receiving portion being meanwhile maintained in the accumulator until such time as the operator may conveniently deliver such accumulated load to transfer mechanism delivering the load to a subsequent processing operation.

It is another object of the present invention to provide accumulator mechanism of the type wherein the desired unit count may be automatically established and the load thus accumulated may be selectively dumped, flexible cable means being provided within the accumulator area to facilitate emptying of the main load accumulator mechanism and to minimize any tendency for the accumulated units to become marred or damaged by sharp contact with the accumulator mechanism.

It is a further object of the present invention to provide substantial savings and economy in labor and space over that possible with conventional accumulator mechanism, the accumulator mechanism of the present invention requiring the attention of an operator only to the extent of selective control of delivery of accumulated loads to a subsequent processing operation, an economy of space also being effected by compact and contiguous in-line or staggered arrangements of a plurality of accumulator mechanisms in conjunction with one or more subsequent transfer mechanisms. It is a related object to further provide for a substantial improvement in speed of handling accumulated units of the character described, whereby the delivery of an accumulated load or package of predetermined number is reduced to a mere control operation insofar as an operator is concerned, thus eliminating the inefficiency inherent in continuous manual handling operations involving heavy manual labor.

It is yet another object of the present invention to automatically provide a readily available running inventory of the number of units and loads accumulated, thereby facilitating the filling of orders and the taking of periodic production inventory.

These and other objects of the present invention will be apparent from the following description of typical embodiments thereof as applied to the accumulation of assorted lumber units, wherein like numerals designate like parts, and wherein:

FIG. 1 is a view in side elevation, with certain parts shown in cross-section, of one embodiment of the present invention, said FIG. 1 specifically illustrating a series of four accumulator stages, also termed unit receiving mechanisms, operating in conjunction with the type of automatic lumber sorting mechanism disclosed in my aforementioned co-pending application, the mechanism of each such unit receiving mechanism comprising an L-shaped accumulator arm or closure member having a flexible connector means attached to the lower arm position of the L-shaped accumulator arm, then extended over a pulley means in the end portion of the upper arm of the closure member which connector member is held under tension by counterweight successively established in loading, trap, and discharge positions under control of a three-position broken-back linkage mechanism connected to the lower arm of said L-shaped closure member.

FIG. 2 presents an end elevation view of the embodiment of the invention illustrated in FIG. 1, taken generally along line 2—2 thereof, with certain parts in section and with the transverse elements broken centrally.

FIG. 3 presents in enlarged detail a side elevation view of the broken-back linkage and associated operating mechanism shown as a component of the embodiment of the invention illustrated in FIGS. 1 and 2, with such linkage in extended position as is the case when the L-shaped accumulator member is in loading position.

FIG. 4 corresponds to the view of the broken-back linkage shown in FIG. 3, with said linkage in intermediate or trap position.

Figure 8:
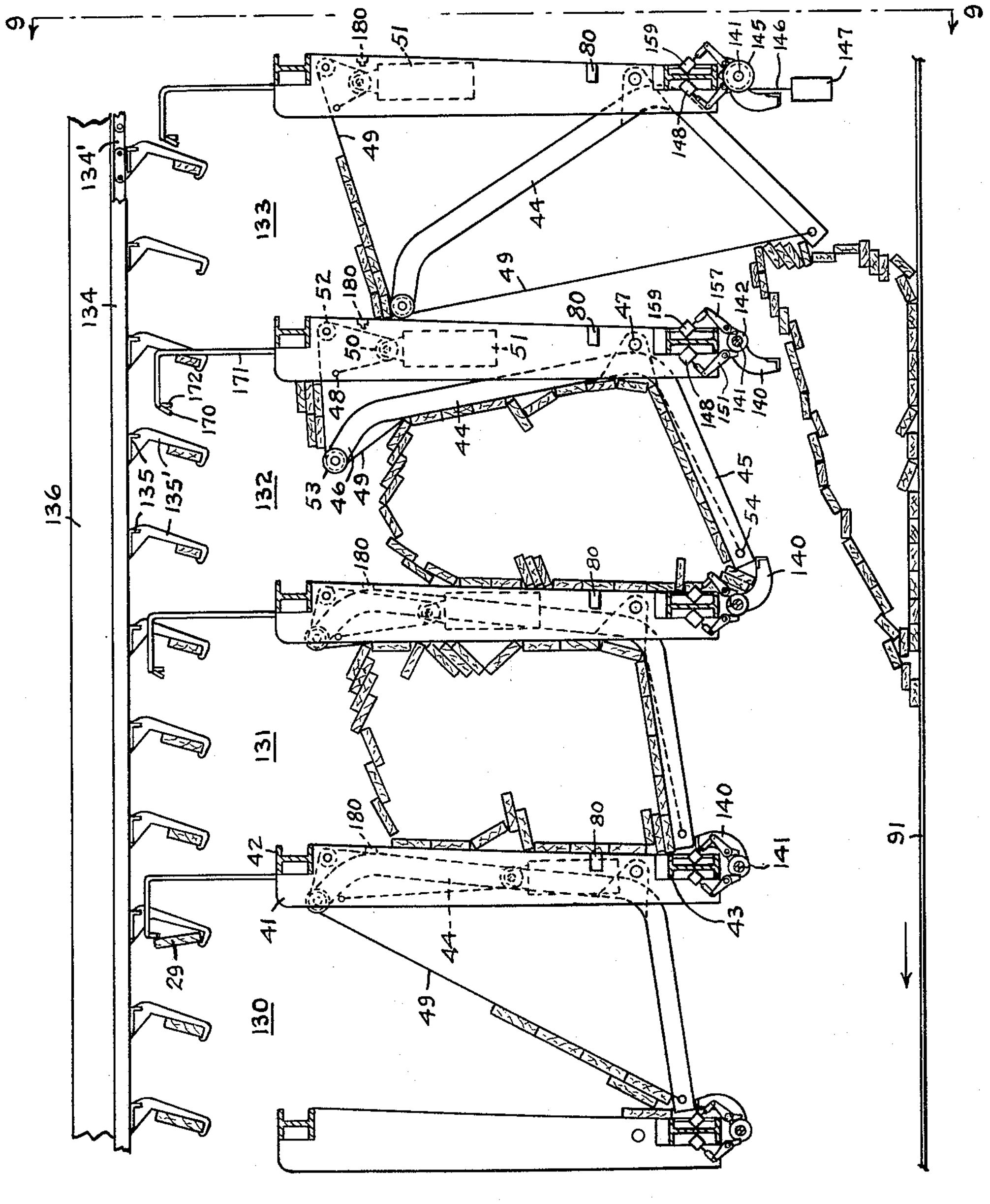

FIG. 8 illustrates a second embodiment of the present invention in side elevation view, with certain parts shown in section and with certain duplicated parts omitted for the sake of clarity, wherein the successive loading, trap, and discharge positions of an L-shaped accumulator member of each unit receiving mechanism is controlled by a latch mechanism adjacent the lower accumulator arm extremity, the embodiment of the invention illustrated in FIG. 8 presenting a series of four accumulator stages in conjunction with a modified form of knock-off pin and counter actuating mechanism, the latter constituting components of the associated unit sorting device.

Figure 9:
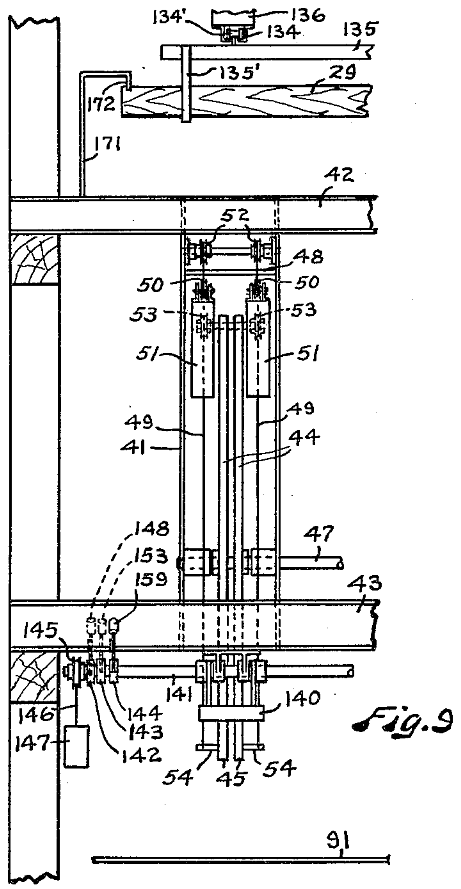

FIG. 9 presents a partial end elevation view of the left hand portion of the embodiment shown in FIG. 8, taken along line 9—9 thereof, illustrating the transverse arrangement of latch control mechanism and counterbalance means associated with one accumulator closure member.

Figure 10:
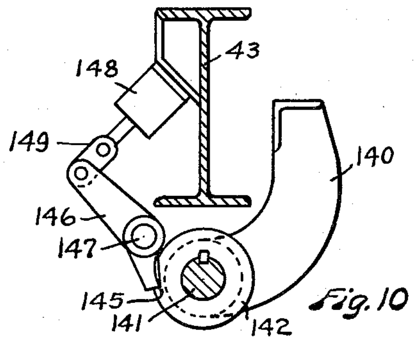

FIG. 10 illustrates in side elevation view and enlarged detail the accumulator member retaining latch in loading position, together with a first control solenoid and actuating linkage for control thereof.

Figure 11:
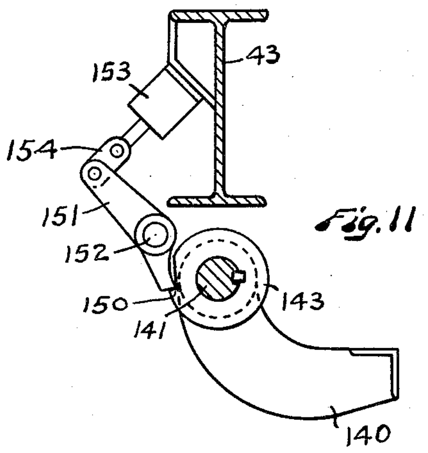

FIG. 11 presents the retaining latch illustrated in FIG. 10, with the latch in intermediate or trap position under control of a second control solenoid.

Figure 12:
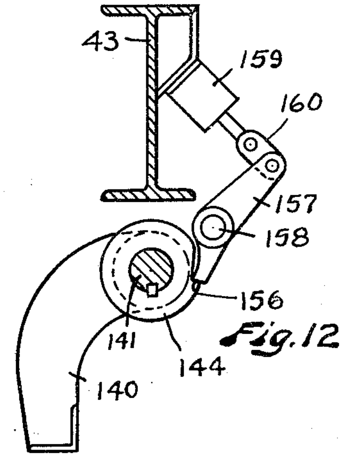

FIG. 12 presents the retaining latch illustrated in FIGS. 10 and 11, with the latch in discharge position under control of a third control solenoid.

Figure 13:
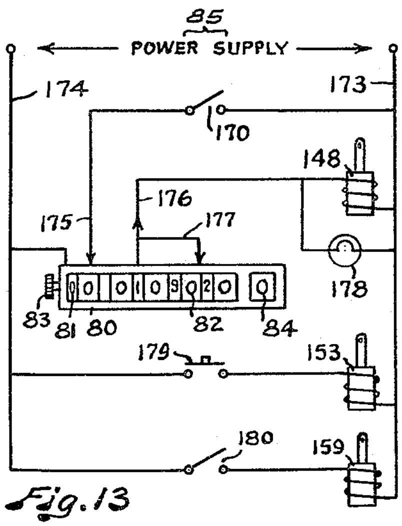

FIG. 13 presents in schematic form the counter and electrical control circuit associated with each accumulator stage in the embodiment of the invention illustrated in FIG. 8.

Figures 14, 16:
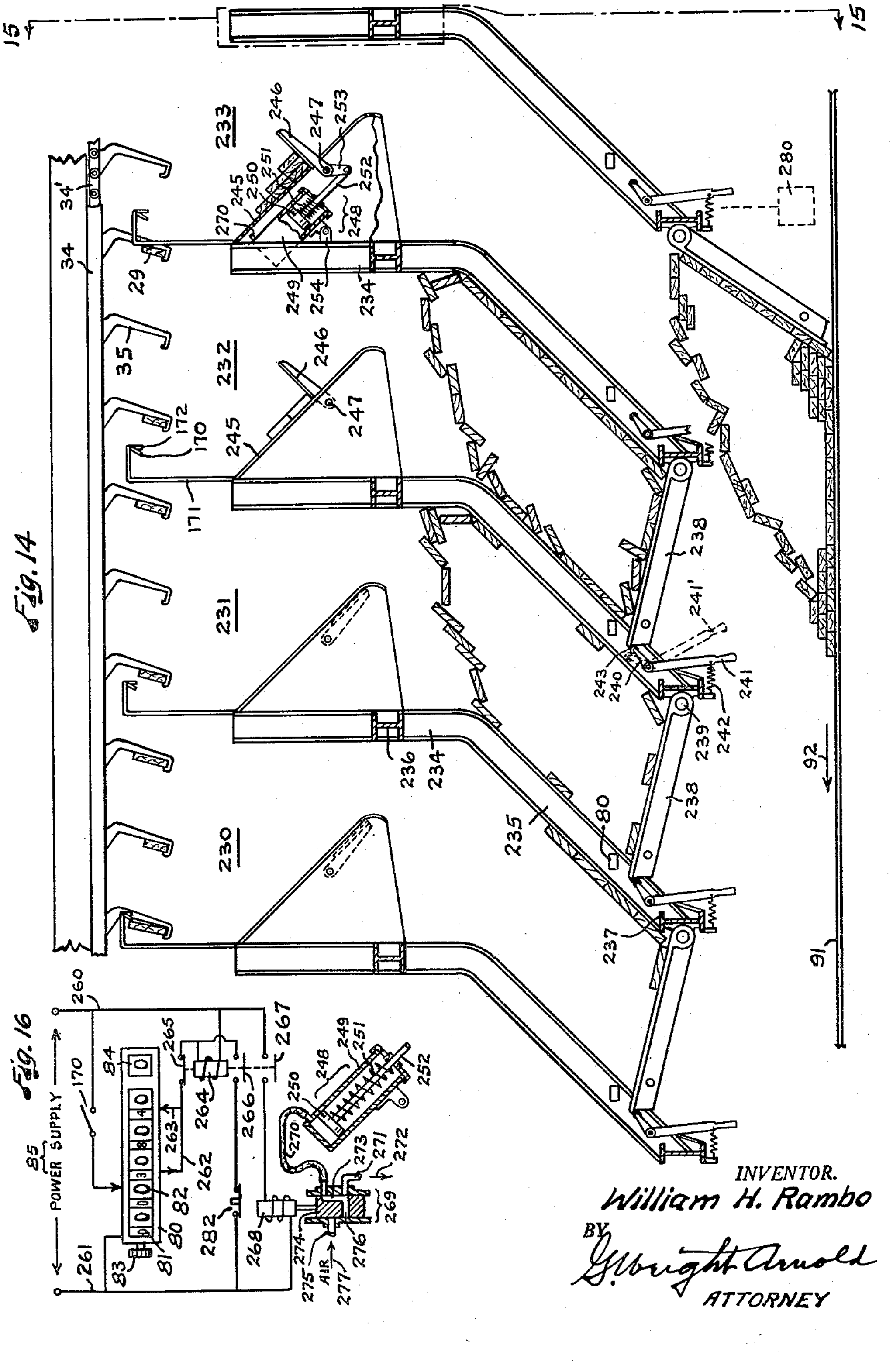

FIG. 14 presents in side elevation view, with certain parts shown in cross-section and with certain duplicated parts omitted for the sake of clarity, a third embodiment of the present invention, with the unit receiving mechanisms each having separate, pivoted lower and upper accumulator arms, the lower arm being retained in loading position by a latch mechanism adjacent the end thereof and the upper or trap arm being maintained in accumulating position under control of an automatically actuated pneumatic mechanism to interrupt the unit flow to the main load accumulating area.

Figure 15:
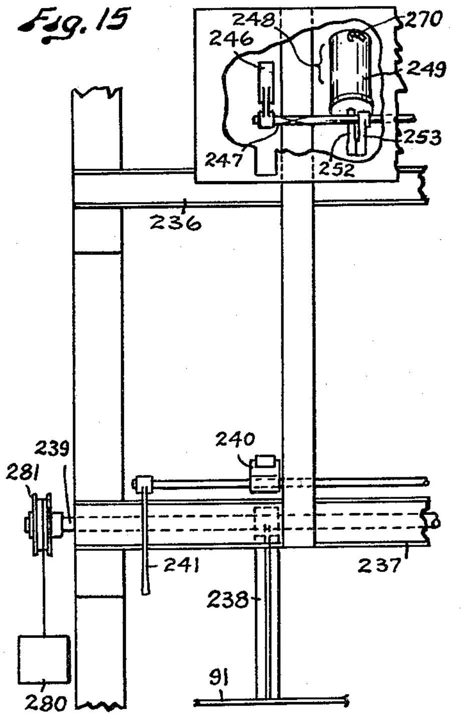

FIG. 15 presents in partial end view the left hand portion of the structural embodiment illustrated in FIG. 14, taken along line 15—15 thereof, with the lumber sorter mechanism omitted.

FIG. 16 presents in diagrammatic form an electrically actuated pneumatic control system for the embodiment of the invention illustrated in FIG. 15.

Figure 17:
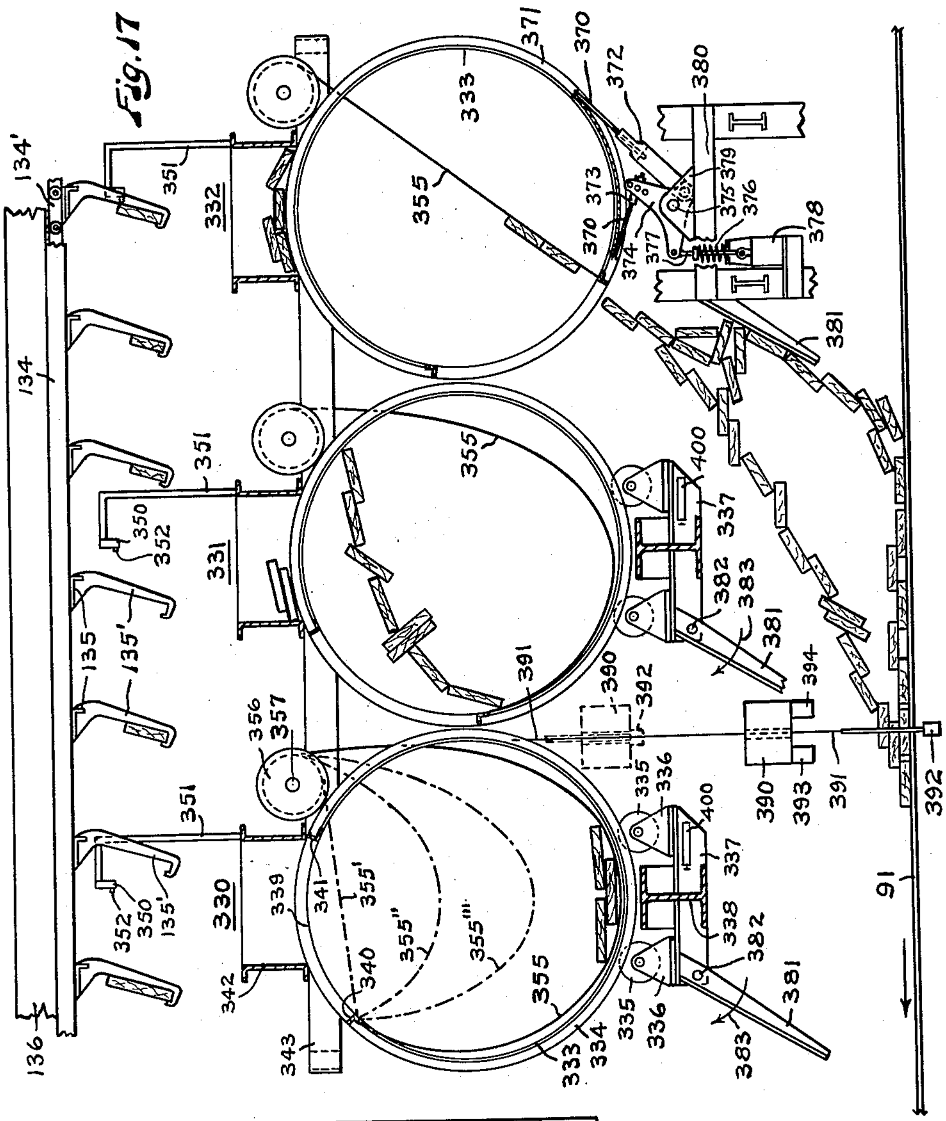

FIG. 17 illustrates in side elevation view a further modification of the present invention, with certain duplicated position control elements omitted for clarity, wherein the load accumulating structure, i.e. the unit receiving mechanism, is of generally cylindrical or drum form and operates by rotation about a horizontal axis through successive loading, trap, and discharge positions to provide a load of precisely predetermined number of units, the units accumulated in an accumulator stage when said stage is in trap and discharge positions being stored in an upper hopper while resting on a circumferential portion of said cylindrical structure.

Figure 18:
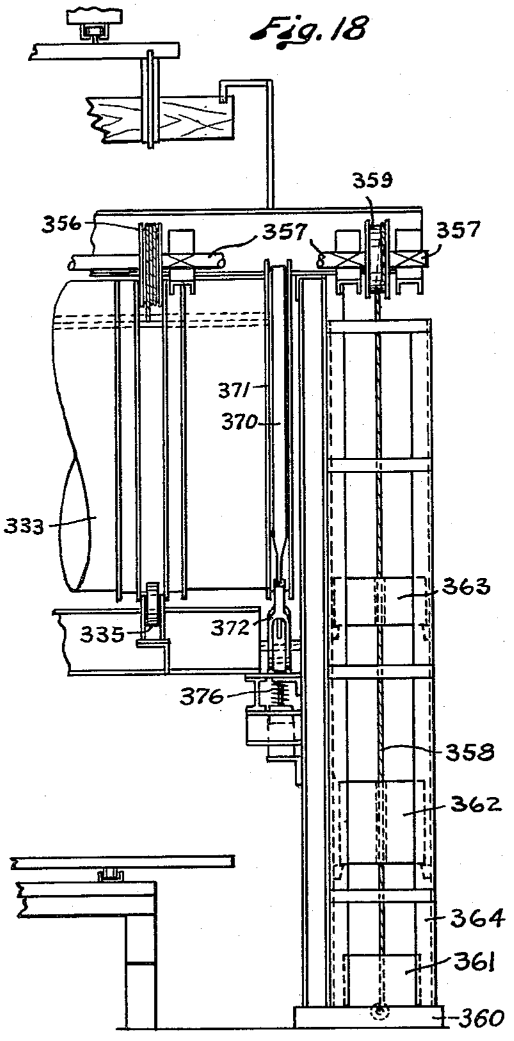

FIG. 18 presents in partial end elevation view the right hand portion of the discharging accumulator of the embodiment of the invention as presented in FIG. 17.

Figure 19:
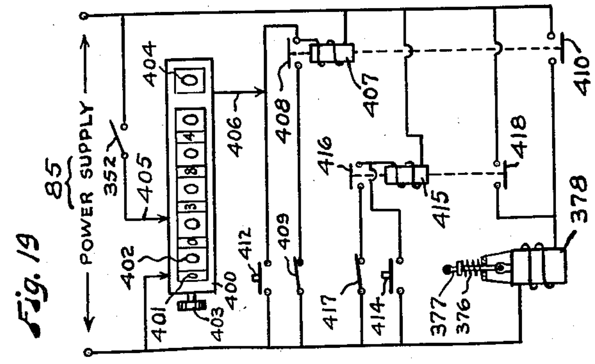

FIG. 19 presents in schematic form the electrical control circuit for the embodiment of the invention illustrated in FIG. 17.

Figure 20:
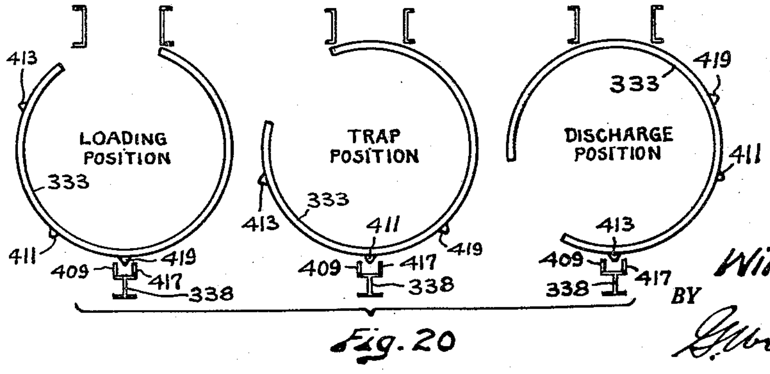

FIG. 20 presents in diagrammatic form a view corresponding to that shown in FIG. 17, providing schematic indication of the relative locations of control limit switch cams in the three successive loading, trap, and discharge positions of a given cylindrical or drum type accumulator stage.

Figure 21:
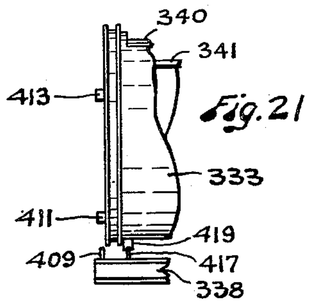

FIG. 21 presents in partial diagrammatic end view the limit switch cam placement of the control arrangement illustrated in FIG. 20.

Figure 22:
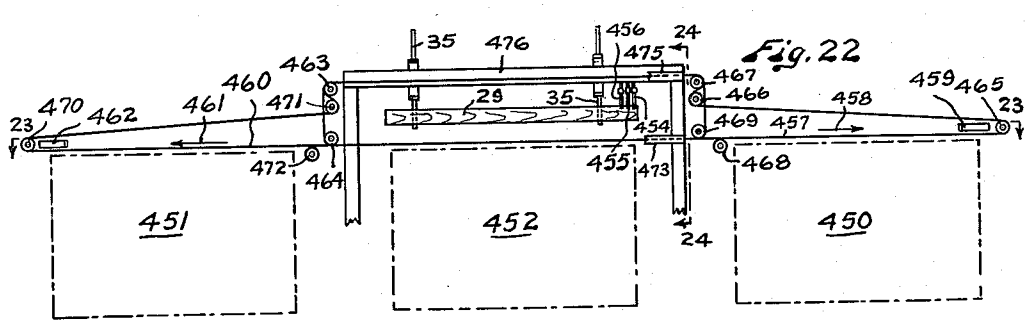

FIG. 22 presents an end view in diagrammatic form of a modified, staggered arrangement of unit receiving mechanisms according to the present invention, providing further advantages in terms of equipment compactness.

Figure 23:
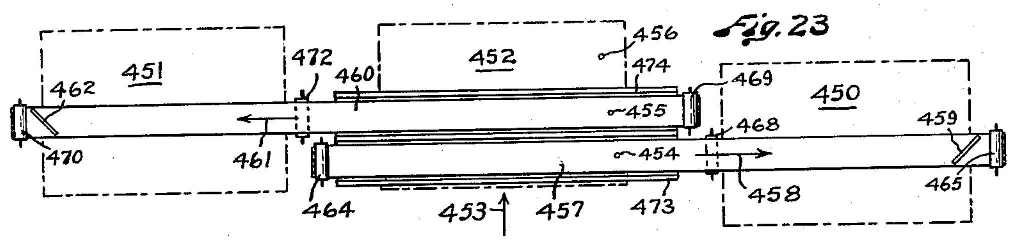

FIG. 23 presents a diagrammatic plan section view, taken generally along line 23—23 of FIG. 22, with various elements of the associated lumber sorting mechanism omitted for the sake of clarity, further illustrating the arrangement of the staggered accumulators presented in FIG. 22.

Figure 24:
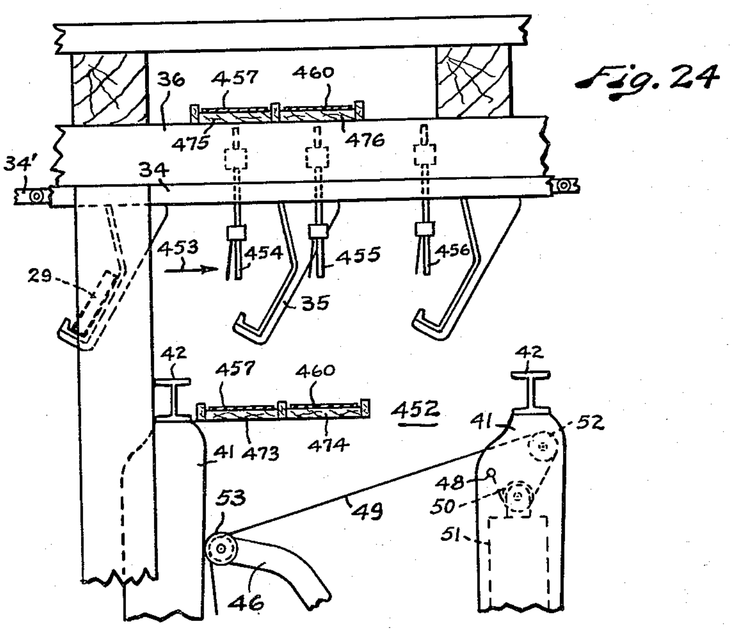

FIG. 24 presents a typical partial side section, taken along line 24—24 of FIG. 22, with the elemental arrangement set forth in further detail, further illustrating such modified form of the invention.

Turning to a more detailed consideration of the embodiment of the invention illustrated in FIGS. 1 through 7, FIG. 1 presents in side elevation view a series of four accumulator stages 30, 31, 32 and 33 according to the present invention, said accumulators being arranged below a lumber sorter mechanism of the type disclosed in my said aforementioned co-pending application, said lumber sorting mechanism comprising a pair of conveyor chain guideways 34, the conveyor chains 34' supported thereby having depending therefrom a series of open-arm unit supports 35, the supporting structure 36 therefor further mounting a series of knock-off pins, one being indicated at 37, each having associated therewith a counter mechanism comprising switch 38 and feeler 39, each of said knock-off pins being arranged according to a predetermined pattern to provide sorting of the lumber units, one being indicated at 29, according to size and/or grade, as desired, as disclosed in the aforesaid co-pending application. From said aforesaid application, it will be readily understood that such knock-off pins 37, in conjunction with depending supports 35 moving lumber units 29 along a path of travel in a direction indicated at 40, will result in units of a given size and/or grade being delivered to a particular accumulator associated therewith.

Figure 1:
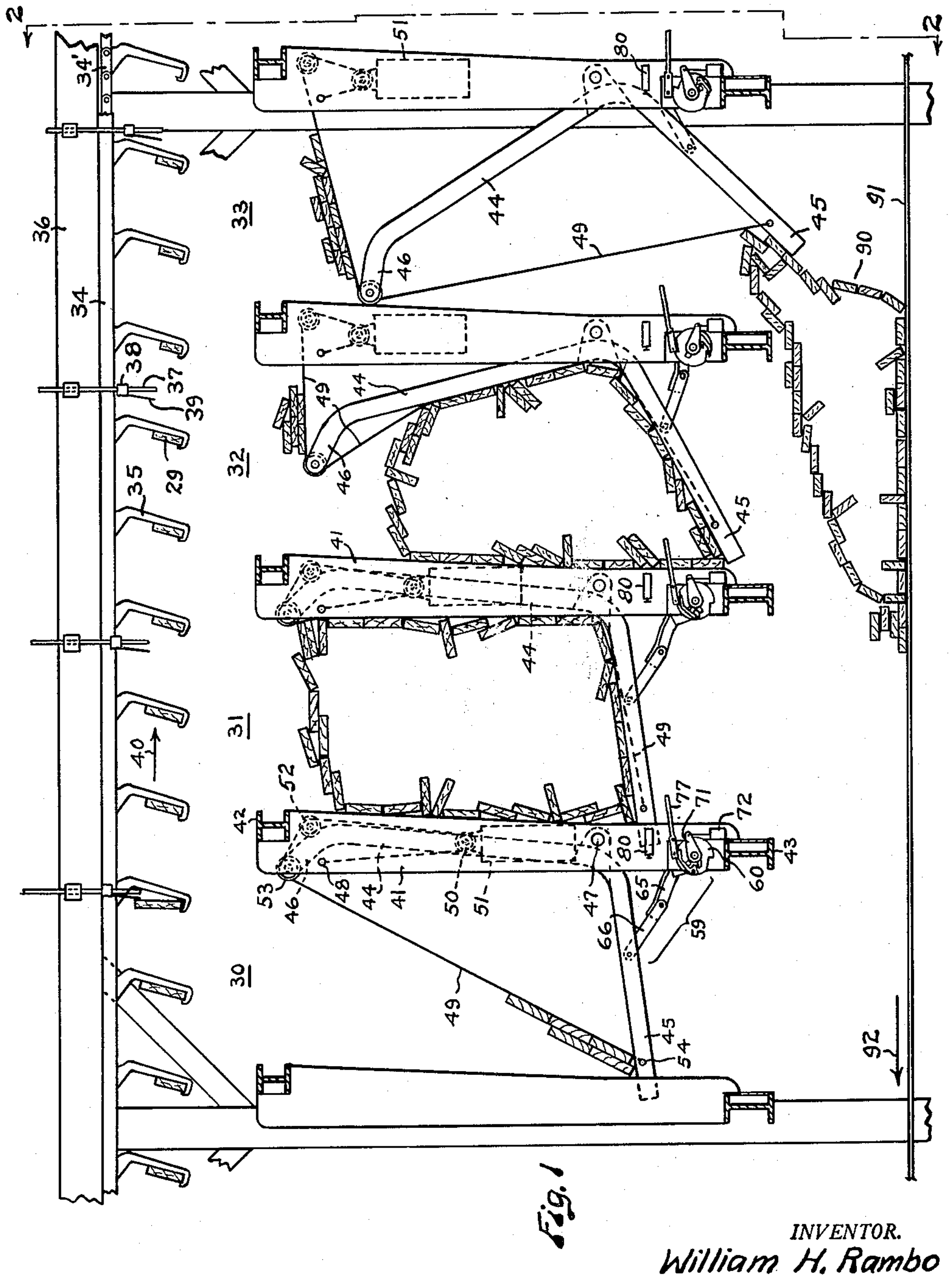
Figures 2, 3, 4, 5, 6, 7:
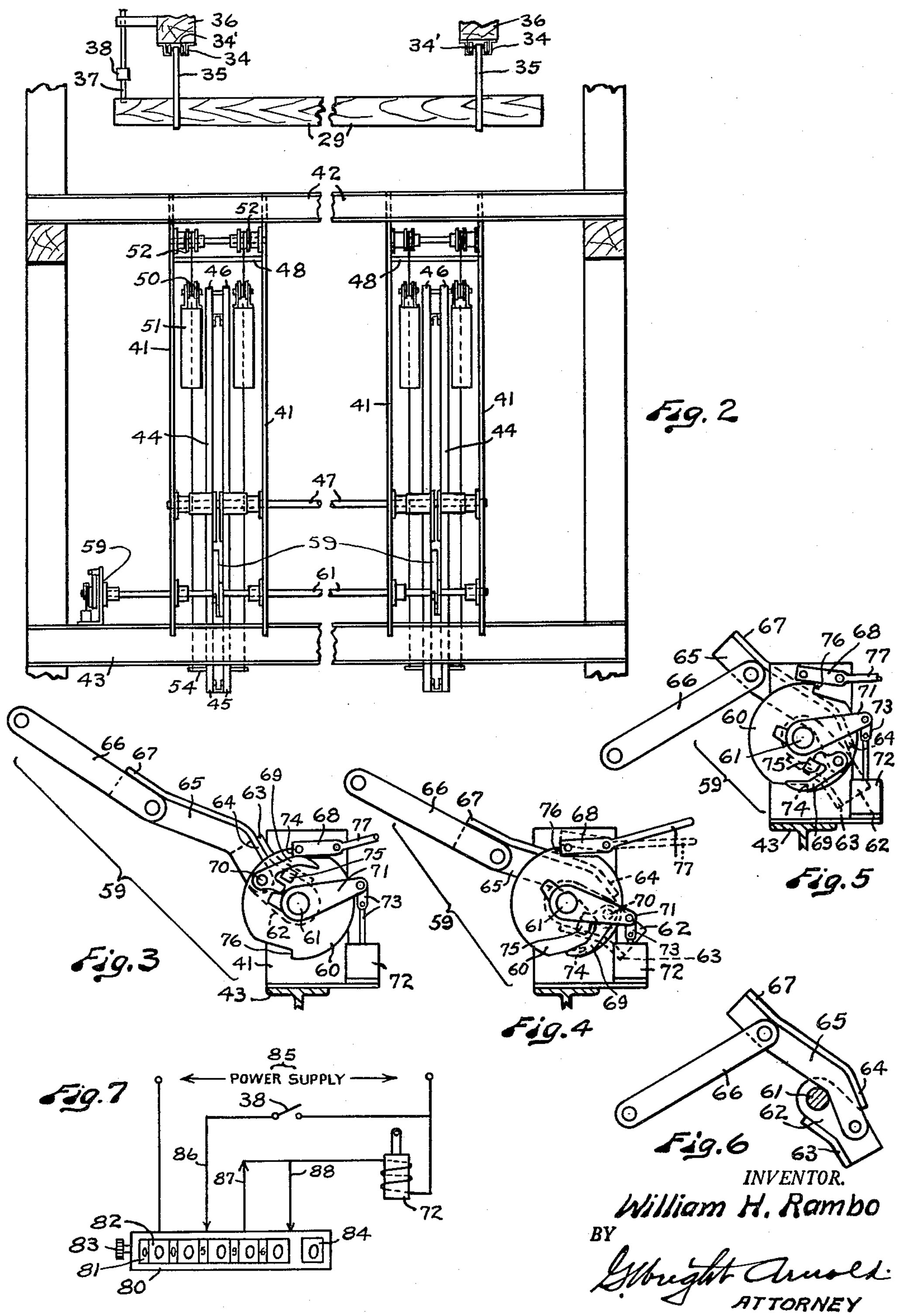
FIG. 5 illustrates the broken-back linkage shown in FIGS. 3 and 4, with said linkage in discharge position.
FIG. 6 is a partial detail view of the linkage condition illustrated in FIG. 5, presenting only the link arm detail for further clarity.
FIG. 7 illustrates in schematic form an electrical control circuit and magnetically actuated counter for predetermining the unit count and establishing the cycle of operation of the embodiment of the invention illustrated in FIG. 1.

In the embodiment of the present invention shown in FIG. 1, the respective elements of the series of accumulator stages 30 to 33 will be seen to involve essentially a duplication of parts, with upright portions 41 being supported by frame elements 42 and 43, and pivotally mounting a pair of closure members 44 of generally L-shaped configuration in each accumulator stage (see FIG. 2). Each said closure member 44 has a lower arm section i.e. a floor forming generally horizontally disposed arm 45 and an upper arm section i.e. uprightly disposed arm 46, said closure members 44 being pivotally mounted with respect to uprights 41 by means of pivot shaft 47. Upright portions 41 additionally anchor at 48 flexible connector means 49, such as cables, which pass through pulley mechanisms 50 of counterweights 51, thence through pulleys 52 on uprights 41 over pulleys 53 situated at the extremities of upper arms 46 of closure members 44, thence to attachments at pins 54 on the lower arm sections 45 of closure members 44.

The four accumulator stages 30 through 33 in FIG. 1 serve to illustrate consecutive stages of operation of the accumulator mechanism of the subject invention, section 30 presenting the condition of operation where closure members 44 are in loading position with only a few of the lumber units situated in the main load accumulation zone and resting on flexible connector means 49, the weight of said units being insufficient to overcome the tension produced on said connectors 49 by counterweights 51, thus providing a sloping guide surface to break the fall of units being delivered from the associated knock-off pin 37 and the corresponding open-arm unit supports 35. Accumulator stage 31 presents the condition of accumulation wherein the main load accumulation zone of the accumulator is substantially full (interior accumulated elements being omitted at stage 31 and elsewhere for brevity of illustration), with closure members 44 still in loading position and connector means 49 fully depressed generally to the outline of closure members 44 by the weight of the accumulated load. Accumulator stage 32 illustrates what is termed the intermediate or trap position of closure members 44, in which trap position lower arm portions 45 of closure members 44 are retained in substantially bridging relation with respect to the adjacent upright members 41 thereby forming a lower main section of the accumulator or main load receiving station while upper arm portions 46 of closure members 44 are positioned intermediately between upright members 41 in a manner allowing accumulation of further sorted units on the upper span of connector means 49 thereby forming an upper accumulating or trap station section, such upper position of accumulation being segregated from the main accumulated load, thus preserving the predetermined count of the latter as hereinafter more fully set forth. Accumulator stage 33 illustrates closure members 44 in discharge position with the lower arm portions 45 thereof separated from the adjacent upright portions 41, thus enabling discharge of the main accumulated load, which action is facilitated by tension on connector means 49 exerted by counterweights 51, upper arm portions 46 of closure members 44 meanwhile being pivoted to a bridging position with respect to the adjacent upright portions 41, allowing further accumulation of units in the trap zone on the upper sections of connector means 49, as necessary.

An important feature of the present invention is found in provision for mechanism whereby a given closure member such as that shown at 44 in FIG. 1, for example, is successively established at loading, trap, and discharge positions in a predetermined manner consistent with the unit load count desired. In the embodiment presented in FIG. 1, this successive positioning of closure members 44 is accomplished through a three-position broken-back linkage mechanism, generally indicated at 59, certain elements of which are shown in enlarged detail in FIGS. 3 through 6, which linkage mechanism comprises a notched cam 60 mounted upon and keyed to a shaft 61, said shaft 61 also mounting a crank arm 62 provided with a stop surface 63 abutting a stop surface 64 on an offset link 65 when the brokenback linkage mechanism 59 is in extended position as shown in FIG. 3. Offset linkage 65, in such extended position, is further connected to straight link 66 and abuts one side thereof in an over-center locked position through action of stop surface 67, said linkages 65 and 66 thereby providing what may be termed on over-center lock toggle mechanism. Straight link 66 is further connected at the outer end thereof to the lower arm portion 45 of each of accumulator arms 44, as shown in FIG. 1. To provide the necessary three-position cycle of operation of the broken-back linkage 59, latch mechanism 68 is disengaged by rotation of lift arm 69 pivoted about pin 70 on cam 60 through action of a second lift arm 71 in turn rotated on shaft 61 by energization of solenoid 72 connected to the said lift arm 71 through suitable linkage, as indicated at 73. As latch mechanism 68 is disengaged from notch 74 of cam 60, when the broken-back linkage mechanism is in the extended position illustrated in FIG. 3, lift arm 69 also contacts abutting portion 75 of cam 60 to rotate said cam 60 sufficiently to separate the previously abutting surfaces 63 and 64 of crank arm 62 and offset linkage 65, whereupon the downward weight upon the linkage exerted by the accumulator arm 44 causes rotation of crank arm 62, shaft 61, and cam 60 to the intermediate or trap position illustrated in FIG. 4, latch mechanism 68 thereupon contacting notch 76 of cam 60 through action of spring press means, not shown, associated with latch 68. At such time as manual actuation of the broken-back linkage mechanism 59 to deliver the accumulator arm 44 to discharge position is desired, latch mechanism 68 is delivered to the dotted line position shown in FIG. 4 by operator actuation through handle means 77, whereupon the continuing downward pressure on the broken-back linkage mechanism causes further rotation of cam 60. Crank arm 62 thereupon produces a slight rotation of off-center link 65 to bring said link 65 in contact with shaft 61 (most clearly illustrated in the partial view of FIG. 6) to cause the over-center toggle formed by linkages 65 and 66 to be broken, resulting in the broken-back linkage 59 assuming the position illustrated in FIG. 5, further resulting in accumulator arms 44 keyed to common pivot shaft 47 assuming the discharge position illustrated at accumulator stage 33 in FIG. 1, the accumulated load being thereby discharged in a manner generally indicated at 90 to a transfer mechanism 91 delivering said accumulated load in the direction indicated at 92 to a subsequent processing operation such as a stacker, not shown. As the accumulated unit load is discharged from accumulator arms 44, the weight thereof becomes less than that exerted by counterweights 51, resulting in the restoration of accumulator arms 44 to the loading position illustrated at accumulator stage 30 in FIG. 1, the broken-back linkage mechanism 59 being restored to extended position by the connection of straight link 66 to lower arm portion 45 of one of accumulator arms 44, which extended position is maintained by the over-center lock character of the toggle linkage comprising links 65 and 66 and by re-engagement of latch 68 with notch 74 of cam 60.

FIG. 7 presents in schematic form a typical unit counter and associated electrical circuit for control of a given accumulator stage in the embodiment of the invention illustrated in FIG. 1. Counter 80, which may be suitably located on the frame structure adjacent the associated accumulator stage for ready viewing by the operator as desired (see FIG. 1), is a commercially available magnetically actuated, pre-set counter of the type capable of counting random input electrical pulses and producing an output pulse when a predetermined, pre-set number of input pulses have been counted. The type of counter employed for convenience in presetting may provide ready indication of the predetermined or preset number of units by small numerals, one being indicated at 81, arranged in an alternate, left-hand manner with respect to larger numerals indicating the actual count, one of which actual count numerals is indicated at 82, the smaller or pre-set numerals 81 being readily re-set or varied as desired through suitable control mechanism actuated by control knob 83 in the manner of a standard odometer. In the type of counter presented, it has also been found advantageous to utilize a totalizer indicator 84 to provide an indication of the total number of cycles of count undertaken by counter 80 during a given period of operation, thus providing readily available information as to the number of loads passing through a given accumulator on a daily or shift basis, and thus making available a continuing inventory of units handled by the accumulator stage.

In the electrical control system shown in FIG. 7, switch means 38 mounted on knock-off pin 37 (see FIG. 1) is connected to a suitable power supply 85 and delivers through lead 86 an electrical pulse for each unit delivered to the associated accumulator stage. Counter 80, when the predetermined, pre-set number of unit pulses are registered, produces on output pulse on lead 87 to energize solenoid 72 of the broken-back mechanism 59, which output pulse on lead 87 is also returned through lead 88, either externally as shown or internally through predetermined design of the counter 80, to provide automatic re-set to zero of counter numerals 82 and establish registration of one load unit on totalizer 84.

From the foregoing it will be apparent that subsequent units delivered to the accumulator stage will be counted as the subsequent load, regardless of whether accumulator arm 44 is in trap or discharge position or has been restored to loading position. It will be further apparent that the control circuit provided will, without further attention from the operator, automatically deliver (through action of solenoid 72 and broken-back linkage mechanism 59) the accumulator arm 44 from loading to trap position, thus accomplishing interruption of the unit delivery to the main accumulated load when the predetermined count is registered on the counter 80.

In the lumber processing industry, it is customary to handle lumber in loads measuring 4′ x 4′ in transverse area when stacked, and the number of units constituting such a load may be readily ascertained and pre-set on the counter. Thus, for a given unit dimension, such as 2″ x 6″ for example, units making up such a load number 192. It has been determined that for this load dimension, each accumulator stage need occupy only about 5½ feet of floor space, measured in the direction of movement of the associated lumber sorter mechanism, thus aptly demonstrating the compact character of the mechanism afforded by the present invention.

Proceeding to a detailed consideration of the modified embodiment of the invention as illustrated in FIGS. 8 through 13, FIG. 8 presents in side elevation view a series of four accumulator stages 130, 131, 132, and 133, said accumulators being arranged below a lumber sorting mechanism somewhat modified from that disclosed in FIG. 1 and the said aforementioned co-pending application. Said modified lumber sorting mechanism comprises a pair of conveyor chain guideways 134 mounted on supporting structure 136, the conveyor chains 134' supported by said guideways 134 having depending therefrom a series of transversely arranged bars 135 each in turn carrying a pair of open-arm unit supports 135'.

With regard to the mechanism arrangement forming each of the accumulator stages 130 through 133, it will be noted from a comparison thereof with accumulator stages 30 through 33 of the embodiment illustrated in FIG. 1 that many features of similarity exist, and like elements accordingly have been assigned like numerals, such as upright portions 41, supported by frame elements 42 and 43, said upright portions 41 in turn pivotally mounting a pair of closure members 44 of generally L-shaped configuration in each accumulator stage, each of said closure members 44 further having a lower arm section 45 and an upper arm section 46, said closure members 44 being pivotally mounted with respect to uprights 41 by means of pivot shafts 47. Upright portions 41 additionally anchor at pins 48 flexible connector means 49, such as cables, which pass through pulley mechanisms 50 of counterweights 51, thence through pulleys 52 on uprights 41 over pulleys 53 situated at the extremities of upper arms 46 of closure members 44, thereupon to attachments at pins 54 to the lower arm sections 45 of closure members 44.

In the modified form of the invention illustrated in FIG. 8, the four accumulator stages 130 through 133 serve to illustrate consecutive stages of operation of the accumulator mechanism, section 130 presenting the condition of operation where closure members 44 are in loading position with only a few of the lumber units 29 situated in the main load accumulation zone and resting on flexible connector means 49, the weight of said units being insufficient to overcome the tension produced in connector means 49 by counterweight 51, thus providing a sloping guide surface to break the fall of units being delivered from the sorter mechanism during the early phases of loading. Accumulator stage 131 presents the condition of accumulation wherein the main load accumulating zone or section of an accumuator stage is substantially full, with closure members 44 still in loading position and connector means 49 fully depressed generally to the outline of closure members 44 by the weight of the accumulated load. Accumulator stage 132 illustrates what has been termed the intermediate or trap position of closure members 44, in which trap position lower arm portions 45 of closure members 44 are retained in substantially bridging relation with respect to the adjacent upright members 41, while upper arm portions 46 and closure members 44 are positioned intermediately between upright members 41 in a manner allowing accumulation of further units on the upper or ledge portion of connector means 49, such upper position and accumulation being segregated from the main accumulated load, thus preserving the predetermined count thereof in the general manner indicated in connection with the first embodiment of the invention. Accumulator stage 133 illustrates closure members 44 in discharge position with the lower arm portions 45 thereof separated from the adjacent upright portions 41 to discharge of the main accumulated load, upper arm portions 46 of closure members 44 meanwhile being pivoted to a substantially bridging position with respect to the adjacent upright portions 41, allowing further accumulation of units in the trap zone or section formed by the upper ledge sections of connector means 49.

In the embodiment of the invention presented in FIGS. 8 through 13, the successive positioning of closure members 44 to the indicated loading, trap, and discharge positions is accomplished by means of latches 140 keyed to a common shaft 141, said shaft 141 also having keyed thereto notched cams 142, 143 and 144. A return counterweight mechanism is also provided for shaft 141, which return mechanism comprises pulley 145 having wound thereon a flexible connector means 146 which is connected to a counterweight 147 in a manner to provide restoration of latch mechanism to loading mechanism, as more particularly set forth in connection with the detailed partial views of the latch actuating mechanism illustrated in FIGS. 10 through 12 and the control circuit schematically presented in FIG. 13. For the sake of brevity of illustration the control mechanism for actuation of latch 140 has been omitted from stages 130 and 131.

Notched cams 142, 143, and 144 on shaft 141 each has associated therewith an actuating mechanism comprising a latch arm actuated by a solenoid (see FIG. 9). As more clearly presented in the partial views available from FIGS. 10, 11, and 12, camway 142 and notched portion 145 thereof are associated with latch arm 146 pivoted about pivot pin 147 by solenoid 148 acting through connecting linkage 149. Correspondingly, notched cam 143 and the notched portion 150 thereof have associated therewith latch arm 151 pivoted about pivot pin 152 by solenoid 153 connected thereto through suitable linkage 154. Thus, solenoid 148 comprises the actuating means for shift of latch 140 from loading to trap position, and solenoid 153 comprises the actuating means for releasing latch 141 from top to discharge position. Further, notched cam 144 and the notched portion 156 thereof have associated therewith latch arm 157 pivoted about pivot pin 158 through actuation of solenoid 159 connected thereto through suitable linkage 160. Thus, solenoid 159 is the actuating means for releasing latch 140 from discharge position, such release enabling the counterweight restoration mechanism comprising counterweight 147 to restore the latch 140 to loading position to provide the desired manner of operation of the embodiment of the invention illustrated in FIG. 8, as hereinafter more fully set forth.

The electrical control and counting circuit for the modification of the invention illustrated in FIG. 8 is presented in FIG. 13, wherein counter 80 is of the same character and performs the same function as the magnetically actuated counter 80 employed in the embodiment illustrated in FIG. 1. A ready indication of the predetermined or pre-set number is available from the small figures thereof, one being indicated at 81, and the actual count being presented by larger figures thereof, one being indicated at 82, the smaller or pre-set numbers 81 being readily reset or varied as desired through suitable control mechanism actuated from control knob 83. In the type of counter presented, as has been previously indicated, it is further advantageous to provide a totalizer indicator 84.

A portion of the counter and control arrangement of the modified form of the invention illustrated in FIG. 8 varies from that utilized in connection with the embodiment of FIG. 1 and provides that the counter mechanism actuating switches, such as indicated at 170, are each pivoted on a support 171 extending upwardly from frame members 42, said support 171 further mounting unit knock-off pins 172 (see FIGS. 8 and 9). In the modified electrical control circuit (FIG. 13) the unit actuated switch 170 is connected to one line 173 from power supply 85, the other line 174 of said power supply 85 being connected directly to the case of counter 80. Switch 170 delivers an electrical pulse to counter 80 for each unit delivered to the associated accumulator stage, such electrical impulses appearing on lead 175.

Counter 80, when a preset number of unit pulses are registered thereon, produces an output pulse on lead 176 to energize solenoid 148 and also provide a re-set signal on lead 177 which is returned through said lead 177, either externally as shown or internally of the counter by pre-design, to accomplish automatic re-set to zero of counter numerals 82 and establish registration of one load unit on totalizer 84. With energization of solenoid 148 (see FIG. 10), latch arm 146 is disengaged from notch 145 on cam 142 and the weight of the accumulated load rotates latch 140 to the position generally indicated at accumulator stage 132 (FIG. 8) where latch arm 151 (FIG. 11) engages notch 150 on cam 143, thus establishing accumulator arms 44 in the trap position shown at said accumulator stage 132. It will be apparent that the output pulse on lead 176 from counter 80 may also be utilized, as desired, to flash a suitable visual indication such as may be provided by lamp 178 connected in parallel with solenoid 148 to provide a further visual signal of the accumulation of a full load in an accumulator stage.

Following establishment of latch 140 in the trap position illustrated in FIG. 11, provision is made in the control circuit therefor for the selective, manually actuated discharge of the main accumulated load by a manually actuated switch 179 which energizes solenoid 153, in turn functioning through the indicated linkage and latch arm to disengage the latter from notch 150, whereupon the continued weight of the load on lower portions 45 of accumulator arms 44 causes latch 140 to be further rotated to the position shown in accumulator stage 133 (see FIGS. 8 and 12), said latch 140 being retained in said discharge position by engagement of latch arm 157 with notch 156 on cam 144. Latch 140 is thereupon maintained in the so-called discharge position illustrated in FIG. 12 until the accumulated load is discharged to transfer mechanism 91 and accumulator arms 44 are restored to loading position by action of connector means 49 and counterweights 51. As said accumulator arms 44 are restored to the loading position, shown at accumulator stage 131 in FIG. 8, limit switch 180 mounted on one of uprights 41 is closed by an accumulator arm 44, thus energizing solenoid 159 which disengages latch arm 157 and notch 156, allowing the counterweight mechanism comprising counterweight 147 to return latch 140 to the loading position shown at accumulator stage 131 in FIG. 8.

A third embodiment of the present invention is presented in FIGS. 14 through 16, FIG. 14 presenting in side elevation view a series of four accumulator stages 230, 231, 232, and 233, FIG. 15 presenting a partial end view of accumulator stage 233, and FIG. 16 schematically presenting a modified control circuit for producing a cycle of operation for one of said accumulator stages 230, 231, 232 and 233, according to the present invention. In this third embodiment, each accumulator stage 230—233 comprises a main load accumulating zone or section in turn comprising a longitudinally adjacent pair of upright frame members 234, the lower portions 235 of which are sloped in the direction of travel of the discharge conveyor means 91, said frame members 234 being supported from the transverse frame structure comprising beams 236 and 237, said main load accumulating zone or section further comprising pivoted floor members 238 each keyed to a common pivot shaft 239 at the lower extremities of frame members 234 and retained in loading or closed position spanning longitudinally adjacent frame lower portions 235 by means of spring pressed latches 240, said latches 240 being manually actuated through operation of handle 241 and retained in locking engagement with said floor members 238 by cooperation of tension springs 242 attached to frame members 237 and notched cam surfaces 243 provided at the free extremity of pivoted floor members 238.

Each accumulator stage 230—233 also comprises an upper trap zone or section for the sorted units being delivered in random manner, which trap zone or section comprises chute 245, preferably arranged at an angle of slope generally perpendicular to the slope of the opposed lower frame portion 235 in the main load accumulation zone or section, and mounted on the opposed upright in a given accumulator stage, said trap zone or section further comprising a trap arm 246 pivotally mounted about a pivot shaft 247, said trap arm 246 being further provided with actuating mechanism including a pneumatically actuated cylinder mechanism 248 comprising cylinder 249, piston 250, compression spring 251, piston rod 252, and lever arm linkage 253 connected to trap arm 246 in a manner to pivot said trap arm through an arc from a generally parallel to a generally perpendicular position with respect to the unit contacting surface of chute 245, said pneumatically actuated mechanism being pivotally mounted on the adjacent frame member 234 through a pivot pin-bearing mounting generally indicated at 254. While pneumatic cylinder 248 is shown only in connection with trap arm 246 in accumulator stage 233, it will be readily understood that identical mechanism, omitted for purposes of brevity of illustration, is provided for actuation of trap arm 246 in the other accumulator stages.

It will be understood from the illustration of the embodiment of the invention shown in FIG. 14 that the lumber unit sorting mechanism associated with the illustrated series of accumulator stages 230 through 233, comprises a pair of conveyor chain guideways 34, the conveyor chains 34' supported thereby having depending therefrom a series of open arm unit supports 35, the construction and arrangement of these elements corresponding to this portion of the sorting mechanism as illustrated in FIG. 1. The illustrated arrangement of unit sorting mechanism in FIG. 14 further incorporates accumulator supported knock-off pins 172, depending from pin supports 171 in turn supported by frame members 234, said pin supports 171 also mounting the unit actuated switches 170, the latter elements being comparable to the corresponding elements of the modification of the invention presented in FIG. 8.

FIG. 16 schematically presents the control components utilized with the modification of the invention illustrated in FIG. 14, for control of a given accumulator stage therein, the unit counter 80 again being suitably located on the frame structure adjacent the associated accumulator stage as illustrated in FIG. 14, and providing ready indication of the pre-set number of units by small numerals 81, and indication of the actual count by larger numerals 82, the pre-set numerals 81 being readily pre-set or varied as desired through actuation of control knob 83. As before, a totalizer indicator 84 is also provided. In the electrical control system shown in FIG. 16, the unit actuated switch means 170 is connected to one lead 260 of power supply 85, the other lead 261 thereof being connected to the casing of counter 80. By actuation of switch 170 on contact with lumber unit 29 delivered to the associated accumulator stage, counter 80 registers one unit count, and upon registration of the pre-set count generates an output signal on lead 262 which serves to re-set counter 80 through lead 263 and to energize air control relay 264. Upon energization of air control relay 264, normally closed contact 265 thereof is opened, thereby preventing any application of false re-set signals to the counter through the feed-back lead 263, and normally open relay 266 of air control relay 264 is closed, serving as an interlock contact to continue energization of air control relay 264 until manually released as hereinafter indicated. A third, normally open contact 267 of air control relay 264 is also closed which in turn energizes solenoid 268 of air control valve 269, said valve 269 being shown in schematic cross-section to provide a clear indication of its operation. Air control valve 269, when in the de-energized condition illustrated in FIG. 16, provides open communication between line 270 of the pneumatic actuating mechanism 248, said line 270 being in turn in open communication with the closed end of cylinder 249 and in open communication with an exhaust line 271 providing flow of air from the closed end of cylinder 249 to the atmosphere through the valve orifice 273, as indicated at 272. As the air control valve mechanism 269 is shifted to energised position as a result of energization of solenoid 268, valve body 274 moves upwardly, connecting an air supply line 275 from the suitable source through orifice 276 and orifice 273 in valve body 264 to line 270, thus delivering air under pressure in the direction generally indicated at 277 to the closed end of cylinder 249 of pneumatic actuation mechanism 248 and forcing piston 250 and connecting shaft 252 against the compression force of spring 251 to raise trap arm 246 in the position indicated at accumulator stages 232 and 233, thus interrupting the random flow of units delivered to the accumulator stage. It will be obvious that a common air supply may be connected to the pressure lines 275 of the control systems for all the accumulator stages in a given installation.

In the light of the foregoing consideration of a typical control system involving pneumatic actuation of the trap arm 246 of an associated accumulator stage, as set forth in FIG. 16, attention will now be given to the three phases of operation of the accumulator stages of the modification of the invention presented in FIGS. 14–16. Generally, accumulator stages 230 through 233 respectively present periods in the cycle of operation of the accumulator stages wherein the lower floor member 238 is in closed or loading position and only a few units have been accumulated in the main load accumulation zone or section (stage 230), wherein the main load accumulation zone or section is substantially full and the desired number of units to constitute a main load will be attained shortly (stage 231), wherein the control system comprising counter 80 has automatically raise trap arm 246 to an upstanding position with respect to the chute 245 in the upper trap chamber of the accumulator stage, thus interrupting the unit flow to the main load accumulation zone or section (stage 232), and wherein trap arm is in continuing trap position, with the lower floor member 238 manually released to load discharging position, thus discharging the accumulated load to the transfer mechanism 91 (stage 233).

In connection with the discharge cycle of operation in the modified embodiment of the invention illustrated in FIG. 14, it is to be noted that the desired manual release to the transfer mechanism 91 is accomplished through manual actuation of handle 241 to the dotted line position indicated at 241′ (see stage 232) to release latch 240 from locking position with respect to notched cam surface 243 at the free extremity of floor member 238. As such release is accomplished, the weight of the accumulated load will pivot floor member 238 downwardly to a position where floor member 238 is substantially parallel to the lower sloping extremity 235 of frame members 234, which substantially parallel relation facilitates the transfer of the accumulated load to transfer mechanism 91 travelling in the direction indicated at 92. As the unit load is carried from floor member 238 along transfer mechanism 91, the reduced weight on floor member 238 becomes less than that exerted by a counterweight restoration means 280 (only one of which is illustrated in connection with accumulator stage 233; (see FIGS. 14 and 15) wound on pulley 281 in turn keyed to shaft 239, thus providing the restoration force to return floor member 238 to the closed or loading position, the tension on spring 242 of the latch mechanism including latch 240 providing automatic re-engagement of latch 240 with notched cam surface 243. Following such restoration of floor member 238 to load supporting position, a normally closed manually actuated switch 282 conveniently situated on the frame structure (see FIG. 16) is disengaged by the operator which opens the interlock circuit for air control relay 264, thus de-energizing said relay 264 and restoring contacts 265, 266, and 267 thereof to de-energized condition until the next full load signal is generated on lead 262 by counter mechanism 80, the opening of contact 267 resulting in the de-energization of solenoid 268 of the air control valve mechanism 269 which, on return to de-energized position, closes the communication between pressure line 275 and cylinder line 270 and places the latter in open communication through orifice 273 with exhaust line 271, the force of compression spring 251 and the accumulated load portion on trap arm 246 providing for return of said trap arm 246 to the depressed position illustrated in accumulator stages 230 and 231.

A fourth modification of the present invention is illustrated in FIGS. 17 through 21. Such modified embodiment is of the type wherein the load accumulating structure in each accumulator stage is of generally cylindrical or drum form and operates by rotation about a horizontal axis through successive loading, trap, and discharge positions as contemplated by the present invention. FIG. 17 presents in side elevation view three stages of such an accumulator. FIG. 18 presents a partial end elevation view of the right-hand portion of one such accumulator stage. FIG. 19 schematically presents an electrical control circuit for one of the accumulator stages illustrated in FIG. 17. FIGS. 20 and 21 respectively present diagrammatic side and end views of the drum type structure, schematically indicating the relative locations of control limit switches and switch actuating cams, as employed in conjunction with the control circuitry presented in FIG. 19.

Considering more specifically the structural arrangement disclosed in FIGS. 17 and 18, each accumulator stage 330, 331 and 332 will be seen as involving a respective duplication of parts, so that specific consideration of the structure of one accumulator stage will suffice to provide those skilled in the art an indication of the over-all structural arrangement typified in this embodiment. The main load accumulation zone of a given accumulator stage, such as stage 330, comprises an open-ended cylinder 333 having a plurality of circumferential strengthening ribs 334, certain of which provide a circumferential rail in guiding engagement with supporting wheels 335 to enable rotation of cylinder 333 about a horizontal axis, said wheels 335 in turn being supported by bearing blocks 336 and frame members 337 and 338. Cylinder 333 is provided throughout most the length thereof with an opening 339 defined by longitudinally extending angle ribs 340 and 341, which opening 339, is of sufficient span in length to accommodate the longest unit to be accumulated. When the cylinder 333 is in the loading position illustrated in accumulator stage 330, i.e. in open communication with an upper or trap hopper member 342 supported by upper frame member 343, lumber units of a particular size and/or grade may be received from the associated lumber sorting mechanism, a portion of which latter mechanism being shown as comprising a pair of conveyor chain guideways 134 mounted on supporting structure 136, the conveyor chains 134′ supported by said guideways 134 having depending therefrom a series of transversely arranged bars 135 each in turn carrying a pair of open-arm unit supports 135′. Knock-off pins 350 of the lumber unit sorter mechanism are positioned on supports 351 extending upwardly from upper or trap member 342, a normally open button-type contact switch 352 being mounted on each of knock-off pins 350, which button-unit type unit actuated switch 352 in turn actuates counter mechanism 400, as hereinafter more fully discussed in connection with the control circuit (FIG. 19) for this embodiment of the invention.

Important features of the modification of the invention illustrated in FIGS. 17 and 18 are found in provision for automatic compensation of the main load accumulation area to the weight of the load portion accumulated and in utilization of such automatic compensation means to provide the appropriate rotation of the cylinder 333 to successive loading, trap, and discharge positions during the cycle of operation of a given accumulator stage. These features are accomplished by a plurality of flexible connector means 355, such as cables, arranged along the span of and connected at one end to angle rib 340 and wound at the other end thereof about a plurality of pulleys 356 arranged along and keyed to a common shaft 357. Connector means 355 are maintained under tension at all times by connection of each such means to a multi-stage counterweight mechanism (illustrated only in FIG. 18 as associated with accumulator stage 332, for sake of clarity) comprising cable 358 wound about a pulley 359 in a direction opposite from the direction of wind of connector means 355, said cable 358 having at its free end an anchor 360 which encounters in lifting engagement a succession of counterweights 361, 362, and 363 supported in the spaced relation shown in counterweight frame 364 to provide a successively increasing tension on connector means 355 as the effective length of the latter becomes extended by increased accumulation of units in the main load accumulated in cylinder 333. Thus, by way of illustrative example, it may be considered that a given accumulated load will weigh approximately 3,000 pounds. Accordingly, counterweights 361, 362, and 363 are pre-selected to weigh 600, 1200, and 600 pounds, respectively, to permit the effective load accumulating area to expand with increase in weight of the accumulated load portion. With such arrangement, and with the cylinder 333 of accumulator 330 in loading position, the connector means 355 will assume the unit receiving position indicated in dotted line at 355' when no units are present. As the weight of the accumulated load increases to a point somewhat above 600 pounds, the force exerted by connector means 355 on shaft 357 will cause pulley 359 and cable 358 to lift counterweight 361 to a position where the latter is in contact with counterweight 362, which rotation of shaft 357 will permit connector means 355 to assume the extended position generally indicated in dotted line at 355''. As the weight of the accumulated load further continues to increase and exceeds approximately 1800 pounds, the additional weight of the load will cause counterweights 361 and 362 to move further upwardly in contacting engagement with counterweight 363, with connector means 355 being further extended to assume the position generally indicated in dotted line 355'''. As the accumulated load weight exceeds approximately 2400 pounds, connector means 355 will be further extended in effective length in the same manner to assume the general or full-load position indicated in solid line at 355.

Other constructional features having to do with control of the rotational position of cylinder 333 during the cycle of operation contemplated by the present invention, as found in the modified embodiment thereof illustrated in FIGS. 17 and 18, include a brake band mechanism (only one such mechanism being illustrated at accumulator stage 332) comprising a steel brake band 370 releasably held in tension engagement with circumferential brake flange 371 by means of brake band links 372 and 373 and connection thereof as indicated to lever block 374 pivoted about pivot pin 375 under action of compression spring 376 exerting tensional force on shaft 377. Shaft 377 is also under control of solenoid 378, the operation of mechanisms 370 through 378 being such that steel brake band 370 is maintained under tension with solenoid 378 in de-energized condition and is released when solenoid 378 is energized, thus enabling rotation of a given cylinder 333 only when the associated solenoid 378 is energized. The brake mechanism comprising lever block 374, pivot pin 375, and pivot base 379 is suitably mounted on the adjacent frame structure 380, as desired.

Having considered the means for selective control against rotation of a given accumulator stage cylinder 333, it is to be noted that connector means 355 in cooperation with the counterweight mechanism comprising pulley 359 on shaft 357 provides for rotation of cylinder 333 in a counter-clockwise direction as viewed in FIG. 17, by reason of the tension maintained on connector means 355, the pull thereby exerted on angle rib 340 being in a generally counter-clockwise direction for all positions thereof approximating full accumulated load. The continued tension on connector means 355, as the accumulator progresses through the trap position illustrated at accumulator stage 331 and the discharge position illustrated in accumulator stage 332, is maintained and materially facilitates the discharge of the accumulated load from cylinder 333 in the latter stage, since the connector means 355 during discharge tends to seek the straight line position thereof illustrated in said latter accumulator stage. Incidental to the mode of operation with the cylinder 333 in discharge position, it will be readily understood that suitable load-receiving elements such as sloping skidways 381, generally parallel to connector means 355 in discharged position, are desirably provided to promote smooth delivery of the accumulated load from cylinder 333 to the receiving transfer mechanism 91. For purposes of minimizing interference with accumulated loads discharged on transfer mechanism 91 from previous accumulator stages, the sloping skidways 381 may be pivoted on the supporting structure 337, as by provision for pivot pins 382 mounting said skidways 381 to permit said skidways 381 to swing upwardly in the direction indicated at 383 in the event the skidway 381 is encountered by an accumulated load discharged to transfer mechanism 91 by an accumulator stage more remote from the stacker.

Having considered the manner in which the accumulator cylinder 333 progresses from loading to discharge positions, it is now appropriate to note that this modified form of the present invention also makes provision for automatic return of cylinder 333 to loading position following discharge, under selective control of the brake mechanism comprising brake band 370. Restoration or reverse rotation of cylinder 333 from the discharge position illustrated at accumulator stage 332 (with the connector means 355 under tension and rotated slightly beyond the center of rotation, as shown), to a point where the tension on connector means 355 continues rotation of said cylinder 333 to loading position is accomplished by what may be termed a resoration counterweight mechanism comprising restoration counterweight 390 and cable 391 connected to angle rib 341, which restoration mechanism is shown only in connection with accumulator stage 330 for clarity of illustration. Cable 391 is provided with a counterweight anchor 392 and counterweight 390 is advantageously supported by suitably provided frame members 393 and 394 when cylinder 333 is in loading position, so that the weight of counterweight 390 will not lessen the tendency of cylinder 333 to rotate from loading to trap position with an accumulated load. However, upon rotation of cylinder 333 to discharge position, counterweight anchor 392 lifts counterweight 390 off supports 393 and 394 and is raised to the position shown in dotted line to effect the indicated counter rotation following discharge.

Considering the mode of operation of a given accumulator stage in the modified embodiment of the invention illustrated in FIGS. 17 and 18, with particular reference to the control circuit components therefor presented in FIGS. 19 through 21, the electrical control circuit comprises counter 400, suitably located on the accumulator frame structure for ready viewing by the operator as desired (see FIG. 17). Counter 400 is a commercially available pre-set counter of the type capable of counting random input electrical impulses and producing an output pulse when a predetermined count of pre-set number of input pulses have been counted. By way of further example, the type of counter 400 employed in this modification of the invention is one which automatically re-sets to zero mechanically, said counter 400 being in other respects similar to counter 80 employed in the previous embodiments of the invention to the extent that the pre-set number of units is indicated by small numerals one of which is indicated at 401, arranged in an alternate, left-hand manner with respect to larger numerals indicating the actual count, one such actual count numeral being indicated at 402. Control knob 403 actuates control mechanism for readily re-setting or varying the pre-set numerals 401, as desired. Counter 400 also incorporates a totalizer indicator 404 to provide an indication of the total number of cycles of count undertaken by counter 400 during a given period of operation.

In the electrical control system shown in FIG. 19, button-type unit actuated switch means 352 mounted on the associated knock-off pin 350 (see FIG. 17) is connected to one line of a suitable power supply 85 and delivers through lead 405 an electrical pulse for each unit delivered to the associated accumulator stage. Counter 400, when the pre-set number of unit pulses are registered, produces an output pulse on lead 406, numerals 402 of counter 400 meanwhile being mechanically and automatically re-set to zero by conventional re-set mechanism in counter 400 as previously indicated, the output pulse appearing on lead 406 serving to energize discharge relay 407. On being energized, discharge relay 407 closes contact 408 thereof which through normally closed discharge limit switch 409 provides an interlock circuit for said discharge relay 407. Contact 410 of discharge relay 407 is also closed on energization thereof and in turn causes energization of brake solenoid 378 which thereupon functions to release brake band 370 from tensional retainment of flange 371 on cylinder 333, permitting the latter to rotate counter-clockwise to the trap position schematically illustrated in the center view of FIG. 20, where limit switch 409 is opened by contact with trap cam 411, thus de-energizing discharge relay 407 and opening contact 410 thereof, in turn de-energizing brake solenoid 378, the brake band 370 being restored to clamping tension with flange 371 through action of spring 376. At this point of operation, the desired number of units to constitute a load is contained in the main load accumulating section provided by cylinder 333, and said cylinder 333 has rotated counter-clockwise to the point where the portions of circumferential ribs 334 adjacent angle rib 341 are positioned to form a floor member with respect to hopper 342 in a manner permitting retention of further units delivered to the accumulator stage in the trap section provided by said ribs 334 and hopper 342.

With the accumulator cylinder 333 in trap position the operator, when a free area on transverse means 91 is presented, actuates manual discharge switch 412 to re-energize discharge relay 407 and again energize brake solenoid 378 through closing of contact 410, the further rotation of cylinder 333 delivering cam 411 past limit switch 409, again closing said limit switch 409 and re-establishing the interlock circuit comprising contact 408 for discharge relay 407, which rotation continues until the cylinder 333 is established in discharge position, whereupon discharge cam 413 again opens limit switch 409 to de-energize discharge relay 407 opening contact 410 thereof and de-energizing brake solenoid 378 to retain said cylinder 333 in the discharge position shown in the right-hand schematic view of FIG. 20.

Following discharge of the accumulator load from the accumulator stage, as previously described, the cylinder 333 is released from discharge position by manual actuation of manual re-set switch 414, causing energization of re-set relay 415, one contact 416 of which provides an interlock circuit through normally closed re-set limit switch 417. Energization of re-set relay 415 causes, by closure of contact 418 thereof, the energization of brake solenoid 378 which, upon release of the mechanism comprising brake band 370, permits rotation of cylinder 333 in a clockwise direction to the loading position thereof illustrated in the left-hand view of FIG. 20, where load cam 419 opens re-set limit switch 417 and the interlock circuit for re-set relay 415, thus de-energizing brake solenoid 378 through opening of re-set relay contact 418, the cylinder 333 thus being restored to loading position. It will be apparent that the units meanwhile accumulated in hopper 342 are deposited on connector means 355 in the main load accumulating area incidental to the restoration of cylinder 333 to load position by removal of ribs 334 from bridging relation with respect to the walls of hopper 342.

FIGS. 22 and 23 respectively present diagrammatic end to plan section views of a further modified form of the invention, comprising arrangement of successive accumulator stages in a transverse pattern with respect to the direction of travel of the associated unit sorting mechanism, to provide further compactness in terms of equipment layout and to effectively and materially reduce the necessary length of an equipment line involving a given number of accumulator stages.

FIG. 24 provides a further view of the form of the invention diagrammatically presented in FIGS. 22 and 23, which view is a partial side section offering a more detailed presentation of this modified arrangement.

In FIGS. 22 through 24, such modified form typically utilizes as elements of the lumber sorter mechanism and associated accumulator stages, certain components found in the embodiments of the invention presented in FIGS. 1 and 8, which component elements to the extent illustrated have been given corresponding designating numerals. Such corresponding elements shown in FIGS. 22 through 24 include those elements of the lumber sorting mechanism comprising conveyor chain guideways 34, with the conveyor chains 34' supported thereby having depending therefrom a series of open arm unit supports 35, said guideways 34 depending from supporting structure 36. Such like elements found in the illustrated associated accumulator stage include upright portions 41 supported by frame elements 42, upper arm sections 46 of the L-shaped closure members of the accumulator stage, and flexible connector means 49 anchored at pins 48 and passing through pulley mechanisms 50 of the counterweights 51, thence over pulleys 52 on upright portions 41, thence over pulleys 53 situated at the extremities of upper arm sections 46. It will of course be understood that other types of accumulator stages, of which the further embodiments of the present invention set forth in FIGS. 14 and 17 are further illustrative, may be arranged in the transverse pattern presented in FIGS. 22–24.

According to the modified arrangement of the invention presented in FIGS. 22 through 24, successive accumulator stages 450, 451 and 452 are arranged as diagrammatically shown by dotted line in a transverse pattern with respect to the direction of travel of the open arm unit supports 35, which direction of travel is schematically indicated at 453. In conjunction with such arrangement of accumulator stages, a series of knock-off pins 454, 455 and 456 are successively arranged along the direction of travel 453 to sweep lumber units 29 of a predetermined respective size and/or grade from said open arm supports 35, said knock-off pin 454 being situated to cause delivery of lumber units 29 contacted thereby to the lower course of belt 457 traveling in the direction indicated at 458 to deliver such lumber unit against an angled knock-off plate schematically indicated at 459, such lumber units 29 being thereby dropped into accumulator stage 450. Correspondingly, such lumber units 29 as are contacted by knock-off pin 455 are transferred to the lower course of belt 460 moving in the direction indicated at 461 and are swept from said belt 460 by the knock-off plate schematically indicated at 462 and thereupon dropped into accumulator stage 451. Such lumber units 29 as are contacted by knock-off pin 456 are dropped directly by gravity fall into accumulator stage 452 in the manner indicated in connection with the previous embodiments of the invention.

It will be readily understood that belt 457 is endless in character and courses rollers 463, 464, 465, 466 and 467, and rests on a suitable support roller 468, with one of such rollers 463 through 467 being driven by suitable means, now shown. Correspondingly, belt 460 courses rollers 467, 469, 470, 471 and 463 and is supported by roller 472, one of said rollers 463, 467 or 469—471 being driven by suitable means, now shown. It will be further understood that belts 457 and 460 are transversely retained and supported by appropriate rail elements 472 and 474 in turn supported by associated frame structure, not shown, associated with frame elements 42, during the lower course thereof, and supported and guided by frame elements 475 and 476 during the upper course thereof, said rail elements 475 and 476 being supported by frame member 36.

It will be readily apparent that the transverse, staggered arrangement of accumulator stages 450, 451 and 452 may be compounded by a series of subsequent and similarly arranged stages to provide three columns of accumulator stages in the direction of travel of the sorting mechanism in a given installation, each such column of accumulator stages being associated with a subsequent transfer mechanism of the character indicated at 91 in the embodiments of the invention previously illustrated. By such arrangement, it will be seen that for a given number of accumulator stages as may be required by a given installation, which may number 180 or even more to provide a complete sort, the dimension in length of the entire installation is effectively reduced to approximately one third over that involving only a single, in-line arrangement of accumulator stages, as a result of the staggered arrangement presented in FIGS. 22 through 24.

In view of the foregoing description of the various modifications and forms of specific embodiments of the present invention, it will be apparent that numerous additional modifications thereof will readily occur to those skilled in the art without departing from the scope of the invention and that the invention is susceptible of wide adaptation in terms of the number and arrangement of accumulator stages employed in a given installation and in terms of the types of power actuation, counter mechanism, and degree of automation involved in the control circuits therefor. By way of further example, in the latter design category it will be further apparent that the various manually-actuated control devices presented may be operated under power from a common remote control panel, and that other operator aids such as signal lights and variations in the power supply features such as hydraulic and pneumatic actuated systems may be utilized, both for the control mechanisms and for power arrangements of common or similar function to the counterweight mechanisms presented.

Further, it will occur to those skilled in the art that, while the invention has been described in the application thereof to the accumulation of sorted lumber units of varying size and/or grade, application thereof to other uses or types of elongated units wherein a precise, predetermined number of units are desired to constitute a load or package for subsequent processing, may be adopted. Additional modifications of the present invention will occur to those skilled in the art, within the scope of the following claims.

What is claimed is:

1. The method of sorting lumber of accumulating a predetermined number of lumber units comprising sortingly releasing from an overhead individual unit carrying mechanism; causing said units to fall in feeding same individually to a temporary accumulating station; dampening the force of the fall of said units because of their weight in preventing injury to said units; registering the count of units so delivered; automatically interrupting such delivery feeding to said accumulating station when said predetermined number of units is so fed; accumulating units subsequently fed at a trap station segregated from said accumulating station; and manipulatively discharging the predetermined number of units accumulated in said main accumulating station to a subsequent processing operation.

2. The method in sorting lumber of accumulating a predetermined number of lumber units delivered at random intervals to an accumulator comprising causing said lumber units to fall in feeding same at random intervals to a main load accumulating station; dampening the force of the fall of said units in preventing injury thereto; registering the count of units so fed; interposing a trap station in the path of feeding said units in response to registration of said predetermined number of units to segregate units subsequently delivered to said accumulator from said predetermined number of units accumulated in said main load accumulating station; manipulatively tripping the units accumulated at the main load accumulating station and automatically mechanically by weight of the load discharging the said predetermined number of units from said main load accumulating station in restoring said station to unit receiving condition while maintaining such subsequently fed units at said trap station to preserve the predetermined count of units so discharged.

3. The method of accumulating a predetermined number of lumber units to constitute an accumulated load thereof, comprising delivering said units to a temporary load receiving station, registering the count of units so delivered interrupting such delivery by interposing a flexible member in the path of delivery of said units, interrupting such delivery in response to the registration of said predetermined number, accumulating the further flow of units at a segregated station while registering the count thereof as the next load being accumulated, and discharging the load constituted by said predetermined number of units accumulated in said main load receiving station.

4. The method of accumulating a predetermined number of units and delivering such as a group to a subsequent unit processing operation, comprising delivering said units individually to a main accumulating station; temporarily holding the units so delivered in said station; registering the count of units so delivered and simultaneously utilizing the weight of the units accumulated in said main accumulating station when the count of said predetermined number of units is met to automatically trip the holding of said group in the main accumulating station and interrupt the delivery to said station of further units and simultaneously utilizing the weight of said units accumulated in said main accumulating station to aid in interposing a trap station in the path of delivery of said units and to discharge the said units from said station and in discharging the said units while other units are being delivered to the trap station; continuing accumulation of units subsequently delivered at said trap station; and utilizing the weight of the accumulated predetermined number of units in said main accumulating station to aid in discharging the same from said main accumulating station.

5. The method of accumulating a predetermined number of units and delivering such as a group to a subsequent unit processing operation, comprising delivering said units individually to a main accumulating station, registering the count of units so delivered, automatically interrupting such delivery to said main accumulating station when said predetermined number of units is so delivered by utilizing the weight of the units accumulated in said main accumulating station to aid in interposing a trap station in the path of delivery of said units, continuing accumulation of units subsequently delivered at said trap station, and thereafter selectively discharging the said predetermined number of units accumulated in said main accumulating station therefrom while utilizing the weight thereof for such discharge and for maintaining said trap station in interposed relation to the path of delivery of subsequent units.

6. An accumulator mechanism for accumulating and segregating a predetermined number of similar units delivered thereto individually and at random intervals, said mechanism comprising an accumulator station including a pivotally mounted closure element mounted upon a forward upright member having angularly disposed lower and upper arms, said lower arm providing a floor member for a main accumulating section in said mechanism; a tensioned flexible connector means one end of which is secured to the upper portion of said upright member, thence led through a pulley supporting a counterweight, thence through a pulley mounted upon said upright, thence passing over a pulley through the upper arm portion of said closure member, and thence to the rearward end portion of said lower arm of said closure member; said upper arm providing a support for said tensioned, flexible connector means in forming a trap section in said mechanism, said arms being selectively pivotable to three positions, first, positioned for delivery of said units to said main accumulating section, second, positioned for delivery of said units to said trap section while units previously accumulated in said main accumulating section are retained segregated therein, and third, positioned for discharge of the units from said main accumulating section while maintaining said trap section in unit receiving position; locking means mounted upon said upright as to one end and as to the other end of said locking means connected to the intermediate portion of said lower arm of said closure member for holding said units in said main accumulating section; means for determining when a predetermined number of units have been delivered to said main accumulating section; and latch means controlling said holding means; means controlled by said determining means for automatically releasing said latch means of said holding means in permitting the pivoting of said arms from the first to the second position to interrupt the flow of units to said main accumulating section, the weight of the accumulated load on said lower arm aiding in such positioning of said element.

7. Mechanism according to claim 6 further comprising said tensioned, flexible connector means as forming a wall of said main accumulating section which wall is expandable upon being contacted by said accumulated units and enables the capacity of said section to increase with the addition of units delivered thereto.

8. The device of the character described comprising a sorting mechanism for elongated units; unit counting means determining the number of units received from said sorting means; a plurality of elongated unit receiving accumulator stations for units delivered thereto by said sorting mechanism in providing compactness each station comprising a forward, considered in direction of feeding, pair of spaced upright members which are disposed transversely of the direction of feeding and a rearward pair of spaced upright members which are disposed transversely of the direction of feeding and in spaced relation to said forward pair of upright members, said station also comprising a substantially right-angled closure member pivotally mounted on the forward upright member of that station, said closure member having a floor forming arm and an uprightly disposed arm supporting a trap means on its upper end portion, said trap means comprising a counterweighted flexible connector means interposable between said arm end portion and said forward upright member of that accumulating station in the path of delivery of said units; locking means having one end mounted upon the upright member and one end mounted upon the floor-forming arm of said closure member; a latch controlling said locking means and operated by said counting means.

9. A device of the character described comprising an accumulator station of a length to accommodate commercial varying lengths of lumber to which station lumber units are fed from overhead transversely of said station which station is formed of a forward, considered in direction of said feeding, pair of forwardly spaced upright members which are disposed transversely of the direction of feeding the rear side of said upright members forming one wall of a bin with the next-in-line pair of upright members in the direction of feed, said lumber units being moved over the accumulator station such that their lengths are transverse to the direction of movement and that said units are dropped into the station so that the length of the station is in a direction to correspond with the length of the dropped lumber; a closure member mounted upon each of the forward of said upright members which closure member is of a generally L-shape having a floor forming horizontally disposed arm and an uprightly disposed arm and an angle point at the juncture of said arms, said closure member being pivotally mounted on said rearward upright member at said angle point said closure member and arms forming the floor and walls of said bin, the length of said floor forming horizontally disposed arm being such as to reach the rear side of the upright members in advance of the upright members on which the L-shaped closure member is pivoted; and a counterweight operatively connected to said closure member, maintaining said horizontal arm in a position to receive lumber dropped onto said arm.

10. A mechanism for accumulating a predetermined number of units delivered thereto individually at random intervals, comprising unit receiving mechanism of a character which may be successively established in loading, trap and discharge positions with respect to the unit so delivered, said loading position presenting a main accumulating section to the units when delivered thereto, said trap position presenting an upper trap section interposed in the flow path of said units to interrupt the flow thereof to said main accumulating section while maintaining the previously accumulated units segregated therein and said discharge position maintaining said trap section and continuing interruption of such unit flow while removing the accumulated units from said main accumulating section, such mechanism further comprising means counting the units delivered to said unit receiving mechanism, and means under control of said counting means to automatically interpose said trap section in the path of flow of said units to said main accumulating section when said predetermined number of units have been delivered to said main load accumulating section, said unit receiving mechanism comprising spaced L-shaped members each having a lower extremity and an upper extremity, such lower extremity forming a lower floor in said main load accumulating section when said mechanism is in loading and trap positions, and said upper extremity comprising said trap section when said L-shaped member is in trap and discharge positions; and said L-shaped members are retained in loading position by a three-position latch means being maintained in an upper angular position while so retaining said L-shaped members.

11. Mechanism according to claim 10, wherein said L-shaped members are retained in trap position when said latch means is in an intermediate angular position.

12. Mechanism according to claim 11, wherein said L-shaped members are released to discharge position under selective control of said latch means by rotation thereof to a lower angular position away from said lower extremities of said L-shaped members.

13. Mechanism according to claim 11, wherein said latch means is transferred from upper to intermediate angular position by automatic actuation of electrical release means under control of said unit counting means.

14. Mechanism according to claim 12, wherein said latch means is released from intermediate to discharge position under selective manual control.

15. Mechanism according to claim 14, wherein said latch means is restored from lower to upper angular position under control of switch means contacted by one of said L-shaped members when in loading position.

16. Mechanism according to claim 15, wherein the means for selectively establishing said latch mechanism in said respective upper, intermediate and lower angular positions each comprises electrically actuated solenoid means selectively releasing notched cams keyed with said latch mechanism to a common shaft.

17. An accumulator for sorted units comprising a lower main accumulating section and an upper accumulating section to which sections units are fed successively said main accumulating section comprising a closure member disposably in closed, trap and discharging positions having a lower floor member maintained in fully closed position when units are fed thereto in loading position and said upper accumulating section comprising uprightly disposed arm of said closure member said closure member being pivotally mounted upon a forward upright member and a counterweight flexible means spanning the space above said main accumulating section engaged by the upper end portion of said uprightly disposed arm, said uprightly disposed arm being maintained in upright position until accumulation of a predetermined number of units in said lower main accumulating section has been fed thereto one end of said flexible connector being fixedly secured to the upper portion of the upright members, then reeved through a pulley mounted counterweight and thence over a pulley mounted on said upright above said counterweight and thence over a pulley carried by the upper arm section of said closure member and thence to the rearward end portion of the lower arm section of the closure member; means for counting the units so accumulated; locking means having one end pivotally mounted on the lower portion of said upright member and the other end pivotally mounted to the lower arm section of the closure member engaging said lower floor member which locking means holds said lower floor member in any of three positions, in closed, trap and discharging positions; latch means mounted on said upright member and adjacent to said locking means, which latch means is subject to control of said counting means in automatically moving said closure member to trap position in providing for accumulation of subsequently received units upon said flexible means tensionally held in spanning position above said main accumulating section in path of units being fed; lever means connected to said locking means which lever means may be selectively manually operated in releasing said lower floor arm section of said closure member to discharge position; said counterweight through said flexible member connected to the lower arm section of the closure member and passing over the upper arm section of the closure member and secured to said upright member operates in restoring said lower floor member to loading position upon discharge of the accumulated units therefrom and simultaneously delivering the accumulated units on said flexible member to the main loading accumulating section upon such restoration.

18. Mechanism for accumulating a predetermined number of elongated units delivered thereto in side-by-side relation at random intervals, comprising a main accumulating section defined by unit receiving mechanism of elongated, cylindrical construction, arranged for selective rotation about the horizontal axis thereof and having provided therein a longitudinally extending unit receiving and discharging opening.

19. Mechanism according to claim 18, wherein such cylindrical mechanism is connected with means for successively establishing the same in loading, trap and discharge positions with respect to the flow of units being accumulated.

20. Mechanism according to claim 19, wherein a plurality of such cylindrical members and associated equipment each constituting an accumulator stage are arranged in a side-by-side, in-line manner in the direction of travel of an associated unit sorting mechanism.

21. Mechanism according to claim 19, wherein a plurality of such cylindrical members are arranged in a transverse pattern with respect to an associated unit sorting mechanism in a manner forming a plurality of columns of in-line arranged accumulator stages, one such column being positioned directly below said accumulator sorter mechanism and other such columns being positioned generally parallel thereto, said units being delivered to said parallel columns by transversely moving belts on which said units are deposited by said sorter mechanism and from which said units are swept by knock-off plates and dropped in the appropriate accumulator stage.

22. Mechanism according to claim 19, further comprising counterweight means suspending a flexible connector means acting on the circumference of said cylindrical member in a manner starting return thereof from discharge position to loading position independently of the rotational force exerted by said flexible connector means.

23. Mechanism according to claim 19, further comprising sloping skidways arranged in the unit discharge path from said cylindrical member when the same is in discharge position in facilitating transfer of the units accumulated in said cylindrical member to a subsequent transfer mechanism.

24. Mechanism according to claim 23, wherein said sloping skidways are pivotally mounted on associated supporting structure in a manner permitting said skidways to be swung upwardly by and out of the way of an accumulated load previously delivered to said subsequent transfer mechanism.

25. Mechanism according to claim 19, further comprising a unit trap section in turn comprising hopper side members arranged in superposed adjacency with respect to said cylindrical member, the open longitudinally extending work receiving opening of said cylindrical member being in open communication with the area between said hopper side members when said cylinder is in loading position, a closed, longitudinally extending, circumferential portion of said cylindrical member being in hopper forming position with respect to said hopper side members when said cylindrical member is in unit trap and discharge positions, said hopper side members and cylindrical member portion thereby constituting said trap section in such latter positions of accumulator operation.

26. Mechanism according to claim 18, further comprising flexible connector means transversely spanning said main accumulating section, said flexible connector means being extensibly arranged and maintained under tension by counterweight mechanism in providing a unit receiving area of increasing dimension in said main accumulating section as the number of units accumulated therein increases, said flexible connector means further exerting a rotational force on said cylindrical member tending to cause rotation thereof away from discharge position when said main accumulating section is empty and tending to cause rotation thereof toward said discharge position when said main accumulating section contains said predetermined number of units.

27. Mechanism according to claim 18, further comprising brake means selectively preventing rotation of such cylindrical member.

28. Mechanism according to claim 21, wherein said brake means is arranged circumferentially of said cylindrical member and further comprises spring pressed brake control means which when de-energized applies a braking action preventing rotation of said cylindrical member, and which when energized releases such braking action permitting rotation of said cylindrical member.

29. Mechanism according to claim 28, wherein said brake control means comprises an electrically energized solenoid selectively energized under control of a unit counting mechanism registering the number of units delivered to the accumulator mechanism, said solenoid when so energized permitting rotation of said cylindrical member from discharge to trap position when said unit counting mechanism has registered thereon such predetermined count.

30. Mechanism according to claim 29, further comprising manually actuated means for energizing such brake release solenoid in enabling rotation of said cylindrical member from trap to discharge position.

31. Mechanism according to claim 30, further comprising manually actuated means for energizing said brake release solenoid in enabling return of said cylindrical member from discharge to loading position following discharge of the accumulated load therefrom.

32. Mechanism according to claim 19, wherein said means for successively establishing said cylindrical mechanism in loading, trap and discharge positions comprises an electrical control circuit selectively controlling rotation of said cylindrical member from loading to trap position, then from trap to discharge position, then restoration thereof from discharge to loading position, said electrical control circuit in turn comprising unit counting means registering the number of units delivered to such accumulator mechanism, said unit counting means generating an output signal in turn energizing a discharge relay in turn energizing solenoid means releasing brake means normally preventing rotation of said cylindrical member, thus permitting rotation of said cylindrical member from discharge to trap position, said electrical control circuit further comprising normally closed limit switch means opened by a trap cam mounted on said cylindrical member and opening said limit switch means when said cylindrical member is rotated to trap position, such opening of said limit switch means causing the de-energization of said discharge relay in turn de-energizing said solenoid and permitting said brake means to retain said cylindrical member in such trap position, manually actuated switch means for again energizing said discharge relay in turn again energizing said solenoid in turn again releasing said cylindrical member permitting further rotation thereof to discharge position, whereupon a second normally closed limit switch is opened by a discharge cam situated on said cylindrical member again de-energizing said discharge relay and again de-energizing said solenoid permitting retention of said cylindrical member in discharge position by said brake means, manually actuated switch means energizing a reset relay in turn energizing said solenoid, permitting return of said cylindrical member to loading position following discharge thereof, whereupon a loading cam situated on said cylindrical member opens a normally closed reset limit switch, again de-energizing said solenoid, again permitting retention of said cylindrical member in loading position by said brake means, the units meanwhile accumulated in said trap section being deposited in said main accumulating section as a consequence of return of said cylindrical member to loading position, said loading position thereafter being maintained until said counting mechanism again registers said predetermined unit count.

33. A device of the character described comprising an accumulator station of a length to accommodate commercial varying lengths of lumber to which station lumber units are fed from overhead transversely of said station which station is formed of a forward, considered in direction of said feeding, pair of forwardly spaced upright members which are disposed transversely of the direction of feeding the rear side of said upright members forming one wall of a bin with the next-in-line pair of upright members in the direction of feed, said lumber units being moved over the accumulator station such that their lengths are transverse to the direction of movement and that said units are dropped into the station so that the length of the station is in a direction to correspond with the length of the dropped lumber; a closure member mounted upon each of the forward of said upright members which closure member is of a generally L-shape having a floor forming horizontally disposed arm and an uprightly disposed arm and an angle point at the juncture of said arms, said closure member being pivotally mounted on said forward upright member at said angle point said closure member and arms forming the floor and walls of said bin, the length of said floor forming horizontally disposed arm being such as to reach the rear side of the upright members in advance of the upright members on which the L-shaped closure member is pivoted and said closure members are joined in movement by the lumber unit extending thereacross; a flexible connector means for each of said closure members which means has an upper and lower end portion; a counter weight for each of said flexible connector means to place same under tension said connector means having one end attached to said upright member and one end attached to the rearward end of the horizontally disposed arm of the closure member; pulley means carried by each of said rearward upright members, such said closure member and said counter weight through which pulley means said connector means is threaded and secured as respects one end to the upper portion of the next forward upright member and the other end of said connector means being secured to the rearward portion of the floor forming horizontally disposed arm of said closure means, forming a sloping, flexible guide extending from the top of said upright closure arm to the forward end of said floor forming horizontally disposed closure arm.

34. A device of the character described comprising an accumulator station of a length to accommodate commercial varying lengths of lumber to which station lumber units are fed from overhead transversely of said station which station is formed of a forward, considered in direction of said feeding, pair of forwardly spaced upright members which are disposed transversely of the direction of feeding the rear side of said upright members forming one wall of a bin with the next-in-line pair of upright members in the direction of feed, said lumber units being moved over the accumulator station such that their lengths are transverse to the direction of movement and that said units are dropped into the station so that the length of the station is in a direction to correspond with the length of the dropped lumber; a closure member mounted upon each of the forward of said upright members which closure member is of a generally L-shape having a floor forming horizontally disposed arm and an uprightly disposed arm and an angle point at the juncture of said arms, said closure member being pivotally mounted on said rearward upright member at said angle point said closure member and arms forming the floor and walls of said bin, the length of said floor forming horizontally disposed arm being such as to reach the rear side of the upright members in advance of the upright members on which the L-shaped closure member is pivoted; and a counterweight operatively connected to said closure member, maintaining said horizontal arm in a position to receive lumber dropped onto said arm; and locking means for holding said closure member in locking position, said locking means being mounted on the forward pair of spaced upright members.

35. A device of the character described comprising an accumulator station of a length to accommodate commercial varying lengths of lumber to which station lumber units are fed from overhead transversely of said station which station is formed of a forward, considered in direction of said feeding, pair of forwardly spaced upright members which are disposed transversely of the direction of feeding the rear side of said upright members forming one wall of a bin with the next-in-line pair of upright members in the direction of feed, said lumber units being moved over the accumulator station such that their lengths are transverse to the direction of movement and that said units are dropped into the station so that the length of the station is in a direction to correspond with the length of the dropped lumber; a closure member mounted upon each of the forward of said upright members which closure member is of a generally L-shape having a floor forming horizontally disposed arm and an uprightly disposed arm providing a locking position and an angle point at the juncture of said arms, said closure member being pivotally mounted on said forward upright member at said angle point providing a trapping and discharging position of said closure, said closure member and arms forming the floor and walls of said bin, the length of said floor forming horizontally disposed arm being such as to reach the rear side of the upright members in advance of the upright members on which the L-shaped closure member is pivoted; and a counterweight operatively connected to said closure member, maintaining said horizontal arm in a position to receive lumber dropped onto said arm; and three position broken-back linkage locking means which determines the locked position, trapping position and discharging position of said closure, said locking means being mounted as to one end thereof on the forward pair of spaced upright members and one end connected to the horizontal arm of said closure member.

36. Mechanism according to claim 9 further comprising three position broken-back linkage locking means for each of said closure members which determines the locked position, trap position and unlocked position of each of said closure members, said locking means being mounted as to one end thereof on the forward pair of spaced upright members and one end connected to the horizontal arm of said closure member.

37. Mechanism according to claim 36 further comprising unit counting means electrically connected to said locking means in automatically releasing the locking means when the predetermined number of units actuate said counting means and permitting the weight of the units supported by said floor forming horizontally disposed arm of said closure member to move the closure member into trap position.

38. Mechanism according to claim 37 further comprising manually actuated means controlling said locking means, manual actuation of which causes delivery of said units in said accumulator station from trap to discharge position in discharging said units from said accumulator station.

39. Mechanism according to claim 34 further comprising a flexible connector means held in a substantially horizontally spanning position as respects a portion thereof, one end thereof being fixed to the outer end of the horizontally disposed arm of the closure member and the other end being fixed to the other portion of the upright member with the counterweight operatively supported on said line below said mounting of said flexible connector to said upright member adjustably extending from the upper portion of said upright arm of the closure member to the rearward upright member; said spanning portion being interposed in the flowpath of said units when said L-shape member is in trap and discharge position, said spanning portion constituting said trap station, said locking means maintaining said horizontal arm of the closure member in loading position and during loading the flexible connector cooperates in maintaining said horizontal arm in loading position.

40. Mechanism according to claim 39 further comprising a flexible connector means and counterweight means said flexible connector means having one end secured to the upper portion of said forward upright member then over a pulley means with a counterweight running upon said connector means and disposed below said pulley means secured to said upright member and then passing over a pulley means on the upper end of the closure arm of said closure member and then to the rearward end portion of the horizontal arm of the closure member, thus is provided extensible portions of said connector means within said accumulating station in presenting sloping receiving surfaces to the fixed units delivered to said accumulating station when said accumulating station is in load position, such connector means defining the accumulator station of expanding capacity with increase in weight of the units accumulated therein.

41. Mechanism according to claim 33 further comprising means successively positioning said accumulator station in successive loading, trap and discharging position, said means comprising a broken-back toggle mechanism providing locked and unlocked positions for said members, said toggle mechanism being floor forming horizontally disposed arm of said closure member and the associated upright member, which toggle mechanism has its members in locked position when said accumulator station is in loading position, which toggle member has its members in locked position when said accumulator station is in discharge position, the transfer of said toggle mechanism from extended to intermediate position being occasioned by latch means automatically released by an electric impulse from a counting means secured adjacently and on one of said forward upright members.

42. Mechanism according to claim 41 further comprising latch means connected to said toggle means in maintaining said toggle means in loading position; and lever means connected to said latch means by which lever means said latch means is manually released from the said toggle means for changing the accumulator station from trap position to discharging position.

43. In the method of accumulating a number of assorted like lumber units in an accumulator station, the steps of continuously feeding at intervals assorted like lumber units to accumulating receiving stations until a predetermined number of said lumber units have been so fed in forming an expandable body thereof; tilting said body of units in closing the path of feeding said units in preserving the said predetermined number of said units while simultaneously supporting units fed while the path of feeding is temporarily closed to said predetermined number of units; manipulatively discharging said body of numbered lumber units; and restoring the accumulating stations to receiving the fed units including those fed after the said path of feeding is temporarily closed.

44. A mechanism for sorted lumber units comprising an accumulator section; spaced pairs of uprights; interconnected L-shaped closure members pivotally mounted between said pairs of uprights, each said L-shaped member having a lower arm bridging the space between the pairs of uprights and an upper arm generally parallel to said pairs of uprights when said L-shaped member is in loading position, each of said L-shaped closure members further having mounted thereon a pulley member adjacent the extremity of the upper arm thereof; flexible connector means connected to the lower arm portion of each of said L-shaped members, said flexible connector means being threaded over said pulley member and maintained under tension by a counter-balance secured thereto; a three-position broken-back linkage operatively connected between the adjacent pair of uprights and said L-shaped members for moving the L-shaped closure members from an extended locked position to an intermediate locked position and then to a fully broken position, which linkage when in extended locked position maintains said lower arm portion in a substantially horizontal position bridging said pairs of uprights, said linkage when in intermediate locked position maintaining said L-shaped members in a trap position with the lower arm portions thereof in substantially bridging relation with the opposed pair of uprights and with the upper arm portions thereof positioned intermediately between the pairs of uprights in a manner allowing subsequently delivered units to accumulate on and be supported by said flexible connector means in a position separated from the main accumulated load, said linkage when in fully broken position maintaining the lower arms of said L-shaped members in a position separated from the opposed pair of uprights permitting discharge of the main accumulated load from said lower arms, such discharge position of said L-shaped members also delivering the upper arm portions thereof to substantially bridging position between said pairs of uprights enabling further accumulation of said units on said flexible connector means, the units so accumulated being swept from a position adjacent the upper extremities of said L-shaped members when said broken-back linkage is restored to extended position; a counter-mechanism for said units delivered to the said accumulator; said broken-back linkage having a latch member which is controlled electrically by said counter-mechanism, automatically releasing said latch and causing said broken-back linkage to move from extended to intermediate position when the predetermined number of units are delivered to said accumulator; and means thereafter manually actuating the latch to move the broken-back linkage from intermediate to discharge position.

45. Accumulator mechanism according to claim 44, wherein such accumulator mechanism is associated with a unit discharge station comprising unit-engaging switch means actuating said unit-counting means, said unit counting means further comprising a load totalizer indicating the total number of loads passing through said accumulator during a given period.

46. Accumulator mechanism according to claim 44, wherein said predetermining unit counter automatically resets to zero on registration of said predetermined number thereon.

47. Mechanism for accumulating a predetermined number of elongated units, comprising unit-receiving mechanism of a character successively established in loading, trap and discharge positions with respect to such units being delivered from a discharge station, said loading position presenting a main accumulating section to said units, said trap position presenting an upper trap section interposed in the flow path of said units from said discharge station for interrupting the flow thereof to said main accumulating section, and said discharge position maintaining said trap section and continuing interruption of such flow while enabling removal of the accumulated units from said main accumulating section, such main accumulating section comprising spaced upwardly extending portions and a floor portion pivotally mounted with respect to one of such upwardly extending portions, manually actuated latch means associated with another of the upwardly extending portions for retaining the unit-receiving mechanism in the loading and trap positions, such accumulating mechanism further comprising means counting the units delivered to said unit-receiving mechanism from the discharge station and means under the control of said counting means to cause the latch means automatically to no longer retain the unit-receiving mechanism in loading position and to cause the latch means to now retain the unit-receiving mechanism with said trap section interposed in the flow path of said units to said main accumulating section when said predetermined number of units have been delivered to said main load-accumulating section.

48. Mechanism according to claim 47, wherein such accumulator mechanism has associated therewith subsequent transfer mechanism receiving the accumulated units therefrom when said accumulator mechanism is in discharge position.

49. Mechanism according to claim 48, wherein said upwardly extending portions in part forming said main accumulating section are sloped in the lower portions thereof in the direction of travel of said subsequent transfer mechanism.

50. Mechanism according to claim 47, wherein said trap section comprises trap arm means automatically interposed in the flow path of said units under control of said counting means.

51. Mechanism according to claim 50, wherein said means under control of said counting means for automatically interposing said trap arm means in the flow path of said units is pneumatically actuated by an electrical control system in turn energized by said counting means.

References Cited in the file of this patent

UNITED STATES PATENTS

| | | |
|---|---|---|
| 723,094 | Wellman | Mar. 17, 1903 |
| 1,614,630 | Petin | Jan. 18, 1927 |
| 1,706,632 | Onstad | Mar. 26, 1929 |
| 1,726,139 | Blasco | Aug. 27, 1929 |
| 1,858,161 | Logie | May 10, 1932 |
| 2,161,734 | Wheless | June 6, 1939 |
| 2,429,159 | Hayes | Oct. 14, 1947 |
| 2,437,007 | Thorns | Mar. 2, 1949 |
| 2,487,265 | Nelson | Nov. 8, 1949 |
| 2,530,057 | Hayes | Nov. 14, 1950 |
| 2,606,483 | Forbes | Aug. 12, 1952 |
| 2,690,257 | Schmied | Sept. 28, 1954 |
| 2,730,302 | Roberts | Jan. 10, 1956 |